United States Patent
Yu et al.

(10) Patent No.: US 12,265,260 B2
(45) Date of Patent: Apr. 1, 2025

(54) OPTICAL FIBER SIGNAL MODE CONVERSION APPARATUS AND CONVERSION METHOD, AND OPTICAL FIBER TRANSMISSION SYSTEM

(71) Applicant: HUAWEI TECHNOLOGIES CO., LTD., Guangdong (CN)

(72) Inventors: Hanchen Yu, Shenzhen (CN); Xiang Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/855,110

(22) Filed: Jun. 30, 2022

(65) Prior Publication Data

US 2022/0334311 A1 Oct. 20, 2022

Related U.S. Application Data

(63) Continuation of application No. PCT/CN2020/141092, filed on Dec. 29, 2020.

(30) Foreign Application Priority Data

Dec. 30, 2019 (CN) .......................... 201911405404.8

(51) Int. Cl.
*G02B 6/14* (2006.01)
*G02B 6/12* (2006.01)
*G02B 6/28* (2006.01)

(52) U.S. Cl.
CPC ................. *G02B 6/14* (2013.01); *G02B 6/28* (2013.01); *G02B 2006/12152* (2013.01); *G02B 6/2821* (2013.01)

(58) Field of Classification Search
CPC .......... G02B 6/14; G02B 6/28; G02B 6/2821; G02B 6/12
See application file for complete search history.

(56) References Cited

U.S. PATENT DOCUMENTS

| 4,828,350 A | * | 5/1989 | Kim ..................... G02B 6/2821 385/28 |
| 5,048,909 A | | 9/1991 | Henry et al. |
| 2003/0081903 A1 | * | 5/2003 | Vahala .................. G02B 6/274 385/11 |

FOREIGN PATENT DOCUMENTS

| CN | 103698848 A | 4/2014 |
| CN | 106556574 A | 4/2017 |

(Continued)

OTHER PUBLICATIONS

Igarashi et al., "All-Fiber-Based Selective Mode Multiplexer and Demultiplexer for Weakly-Coupled Mode-Division Multiplexed Systems," Optics Communications, Feb. 2018, 5 pages.

(Continued)

*Primary Examiner* — Ryan A Lepisto
*Assistant Examiner* — Erin D Chiem
(74) *Attorney, Agent, or Firm* — Fish & Richardson P.C.

(57) ABSTRACT

An example optical fiber signal mode conversion apparatus includes a non-single-mode optical fiber and a single-mode optical fiber. The single-mode optical fiber forms, with the non-single-mode optical fiber, a first coupling region and a second coupling region along a signal transmission direction in the non-single-mode optical fiber, where an effective refractive index of a fundamental mode signal of the single-mode optical fiber in the first coupling region is equal to an effective refractive index of a signal in a first mode, the signal in the first mode is coupled to a fundamental mode channel of the single-mode optical fiber, and an effective refractive index of the fundamental mode signal of the single-mode optical fiber in the second coupling region is equal to an effective refractive index of a signal in a second mode.

20 Claims, 17 Drawing Sheets

(56) References Cited

FOREIGN PATENT DOCUMENTS

| CN | 106712850 A | 5/2017 |
|---|---|---|
| CN | 106842430 A | 6/2017 |
| CN | 207704070 U | 8/2018 |
| CN | 108519641 B | 7/2019 |
| JP | S61288140 A | 12/1986 |
| JP | H04242227 A | 8/1992 |
| JP | H10104460 A | 4/1998 |
| JP | 2018036582 A | 3/2018 |
| WO | 9963375 A1 | 12/1999 |
| WO | 1999063375 A1 | 12/1999 |
| WO | 2013000386 A1 | 1/2013 |

OTHER PUBLICATIONS

Arik et al., "Group Delay Management and Multiinput Multioutput Signal Processing in Mode-Division Multiplexing Systems," Journal of Lightwave Technology, vol. 34, No. 11, Jun. 1, 2016, 14 pages.
International Search Report and Written Opinion in International Appln. No. PCT/CN2020/141092, mailed on Mar. 26. 2021, 18 pages (with English translation).
Li et al., "Mode converters and couplers for few-mode transmission," 2012 IEEE Photonics Society Summer Topical Meeting Series, Jul. 9, 2012, 2 pages.
Office Action in Japanese Appln. No. 2022-540386, dated Apr. 25, 2023, 6 pages (with English translation).
Extended European Search Report in European Appln No. 20910073.4, dated May 12, 2023, 30 pages.

* cited by examiner

OPTICAL FIBER SIGNAL MODE CONVERSION APPARATUS AND CONVERSION METHOD, AND OPTICAL FIBER TRANSMISSION SYSTEM

CROSS-REFERENCE TO RELATED APPLICATIONS

This application is a continuation of International Application No. PCT/CN2020/141092, filed on Dec. 29, 2020, which claims priority to Chinese Patent Application No. 201911405404.8, filed on Dec. 30, 2019. The disclosures of the aforementioned applications are hereby incorporated by reference in their entireties.

TECHNICAL FIELD

This application relates to the field of optical communication technologies, and in particular, to an optical fiber signal mode conversion apparatus, an optical fiber signal mode conversion method, and an optical fiber transmission system.

BACKGROUND

With explosive growth of information transmission requirements, a conventional single-mode optical fiber gradually approaches a transmission limit, and a new manner represented by few-mode multiplexing and multi-mode multiplexing is widely concerned. For example, in a few-mode multiplexing technology, an independent orthogonal mode in a few-mode optical fiber is used as a transmission channel, to multiply an optical transmission capacity.

One of core problems of few-mode optical fiber communication is mode conversion. The mode conversion mainly includes two types. One type is mode multiplexing and demultiplexing, where the mode multiplexing means that fundamental mode signals in a plurality of single-mode optical fibers are multiplexed to a few-mode optical fiber and are transmitted as fundamental mode signals and high-order mode signals (the fundamental mode signals and the higher-order mode signals in the few-mode optical fiber are synthesized into a few-mode multiplexed signal); and the mode demultiplexing means that the few-mode multiplexed signal is demultiplexed to fundamental mode signals in the plurality of single-mode optical fibers for transmission. The other type is that any mode in a few-mode multiplexed signal is converted into another mode for transmission, or a plurality of modes in the few-mode multiplexed signal are converted into a plurality of other modes. The second type of mode conversion has important applications in scenarios such as mode cyclic conversion and mode add/drop multiplexing.

SUMMARY

Embodiments of this application provide an optical fiber signal mode conversion apparatus, an optical fiber signal mode conversion method, and an optical fiber transmission system. A main objective is to provide an optical fiber signal mode conversion apparatus that can convert one mode into another mode.

To achieve the foregoing objective, the following technical solutions are used in embodiments of this application.

According to a first aspect, this application provides an optical fiber signal mode conversion apparatus, configured to convert a first mode into a second mode. The optical fiber signal mode conversion apparatus includes: a non-single-mode optical fiber, where the non-single-mode optical fiber includes a first mode channel and a second mode channel, the first mode channel is configured to transmit a signal in the first mode, and the second mode channel is configured to transmit a signal in the second mode; and a single-mode optical fiber, configured to form, with the non-single-mode optical fiber, a first coupling region and a second coupling region along a signal transmission direction in the non-single-mode optical fiber, where an effective refractive index of a fundamental mode signal of the single-mode optical fiber in the first coupling region is equal to an effective refractive index of the signal in the first mode, the signal in the first mode may be coupled to a fundamental mode channel of the single-mode optical fiber, an effective refractive index of the fundamental mode signal of the single-mode optical fiber in the second coupling region is equal to an effective refractive index of the signal in the second mode, and the fundamental mode signal of the single-mode optical fiber may be coupled to the second mode channel.

In the optical fiber signal mode conversion apparatus provided in this embodiment of this application, the single-mode optical fiber forms the first coupling region and the second coupling region with the non-single-mode optical fiber. Because the effective refractive index of the fundamental mode signal of the single-mode optical fiber in the first coupling region is equal to the effective refractive index of the signal in the first mode, the signal, in the first mode, of the non-single-mode optical fiber can be coupled to the fundamental mode channel of the single-mode optical fiber; and because the effective refractive index of the fundamental mode signal of the single-mode optical fiber in the second coupling region is equal to the effective refractive index of the signal in the second mode, the fundamental mode signal of the single-mode optical fiber can be coupled to the second mode channel of the non-single-mode optical fiber. Therefore, in this embodiment of this application, the effective refractive indexes of the fundamental mode signal of the single-mode optical fiber in the first coupling region and the second coupling region are set to be different, so that when the fundamental mode signal decoupled to the single-mode optical fiber is transmitted to the second coupling region, the effective refractive index of the fundamental mode signal changes, and finally, the fundamental mode signal coupled to the second mode is coupled to the second mode channel of the non-single-mode optical fiber, thereby converting the first mode into the second mode.

In a possible implementation of the first aspect, the non-single-mode optical fiber includes a first optical fiber, the first coupling region is formed between the single-mode optical fiber and the first optical fiber, and the second coupling region is formed between the single-mode optical fiber and the first optical fiber. In other words, the first mode may be converted into the second mode on a same optical fiber.

In a possible implementation of the first aspect, the non-single-mode optical fiber includes a first optical fiber and a second optical fiber, the first coupling region is formed between the single-mode optical fiber and the first optical fiber, and the second coupling region is formed between the single-mode optical fiber and the second optical fiber. In other words, the converted second mode may be converted to another optical fiber, to be used in a mode add/drop multiplexing scenario.

In a possible implementation of the first aspect, a length of the first coupling region is equal to a coupling length for the signal in the first mode to be coupled to the fundamental mode channel of the single-mode optical fiber. Because the length of the first coupling region is equal to the coupling length for the signal in the first mode to be coupled to the fundamental mode channel of the single-mode optical fiber, compared with a case in which the length of the first coupling region is equal to an integer multiple, greater than 1, of the coupling length for the signal in the first mode to be coupled to the fundamental mode channel of the single-mode optical fiber, a length of the non-single-mode optical fiber is significantly reduced, and for an all optical fiber transmission system, a length of the entire all optical fiber transmission system is also effectively reduced.

In a possible implementation of the first aspect, a length of the second coupling region is equal to a coupling length for the fundamental mode signal of the single-mode optical fiber to be coupled to the second mode channel. Because the length of the second coupling region is equal to the coupling length for the fundamental mode signal of the single-mode optical fiber to be coupled to the second mode channel, compared with a case in which the length of the second coupling region is equal to an integer multiple, greater than 1, of the coupling length for the fundamental mode signal of the single-mode optical fiber to be coupled to the second mode channel, the length of the non-single-mode optical fiber is significantly reduced, and for the all optical fiber transmission system, the length of the entire all optical fiber transmission system is also effectively reduced.

In a possible implementation of the first aspect, in the first coupling region, the non-single-mode optical fiber and the single-mode optical fiber are arranged in parallel, and a cladding of the non-single-mode optical fiber and a cladding of the single-mode optical fiber are spliced; in the second coupling region, the non-single-mode optical fiber and the single-mode optical fiber are arranged in parallel, and the cladding of the non-single-mode optical fiber and the cladding of the single-mode optical fiber are spliced; and a value range of a distance d between a center of a core of the non-single-mode optical fiber and a center of a core of the single-mode optical fiber is: $d \in [R_{f1}+R_{s1}, R_{f2}+R_{s2}]$, where $R_{f1}$ is a radius of the core of the non-single-mode optical fiber, $R_{s1}$ is a radius of the core of the single-mode optical fiber, $R_{f2}$ is a radius of the cladding of the non-single-mode optical fiber, and $R_{s2}$ is a radius of the cladding of the single-mode optical fiber.

In a possible implementation of the first aspect, a refractive index of the core of the single-mode optical fiber in the first coupling region is a first refractive index, a refractive index of the core of the single-mode optical fiber in the second coupling region is a second refractive index, a refractive index of the core of the single-mode optical fiber in a non-coupling region between the first coupling region and the second coupling region is a third refractive index, and the third refractive index is between the first refractive index and the second refractive index.

Because the third refractive index is between the first refractive index and the second refractive index, when the single-mode optical fiber is processed and fabricated, compared with a case in which the third refractive index sometimes exceeds the first refractive index and sometimes exceeds the second refractive index, processing difficulty of the single-mode optical fiber is significantly reduced.

In a possible implementation of the first aspect, the first mode and the second mode are two modes in a degenerate mode; the effective refractive index of the fundamental mode signal of the single-mode optical fiber in the first coupling region is equal to the effective refractive index of the fundamental mode signal of the single-mode optical fiber in the second coupling region; and the center of the core of the non-single-mode optical fiber and the center of the core of the single-mode optical fiber are on a first straight line along a cross section of the non-single-mode optical fiber in the first coupling region, the center of the core of the non-single-mode optical fiber and the center of the core of the single-mode optical fiber are on a second straight line along the cross section of the non-single-mode optical fiber in the second coupling region, and an included angle between the first straight line and the second straight line is equal to a phase difference between the first mode and the second mode.

When the first mode and the second mode are two modes in the degenerate mode, the effective refractive index of the fundamental mode signal of the single-mode optical fiber in the first coupling region is equal to the effective refractive index of the fundamental mode signal of the single-mode optical fiber in the second coupling region, and the included angle between the first straight line and the second straight line is equal to the phase difference between the first mode and the second mode, so that conversion between the first mode and the second mode in the degenerate mode can be implemented. Therefore, in this embodiment of this application, mode conversion in the degenerate mode is implemented, and an application scenario of the optical fiber signal mode conversion apparatus is expanded.

In a possible implementation of the first aspect, the second mode is a degenerate mode, and the second mode includes a first submode and a second submode; the optical fiber signal mode conversion apparatus is configured to convert the first mode into the first submode, the effective refractive index of the fundamental mode signal of the single-mode optical fiber in the second coupling region is $n_1$, the optical fiber signal mode conversion apparatus is further configured to convert the first mode into the second submode, the effective refractive index of the fundamental mode signal of the single-mode optical fiber in the second coupling region is $n_2$, and $n_1=n_2$; and the optical fiber signal mode conversion apparatus is configured to convert the first mode into the first submode, the center of the core of the non-single-mode optical fiber and the center of the core of the single-mode optical fiber are on a third straight line along a cross section of the non-single-mode optical fiber in the second coupling region, the optical fiber signal mode conversion apparatus is further configured to convert the first mode into the second submode, the center of the core of the non-single-mode optical fiber and the center of the core of the single-mode optical fiber are on a fourth straight line along the cross section of the non-single-mode optical fiber in the second coupling region, and an included angle between the third straight line and the fourth straight line is equal to a phase difference between the first submode and the second submode.

When the second mode includes two submodes that are degenerate modes, in the second coupling region, $n_1=n_2$ and the included angle between the third straight line and the fourth straight line is equal to the phase difference between the first submode and the second submode. In this way, the first mode can be converted into the first submode in the degenerate mode or the first mode can be converted into the second submode, to implement mode differentiation in the degenerate mode.

In a possible implementation of the first aspect, the optical fiber signal mode conversion apparatus is configured to convert N modes, and N is an integer greater than or equal to 2; the non-single-mode optical fiber includes N mode channels, and the N mode channels are in a one-to-one correspondence with the N modes; there are N single-mode optical fibers, and any single-mode optical fiber forms the first coupling region and the second coupling region with the non-single-mode optical fiber; a mode that is of the non-single-mode optical fiber and that is coupled to any single-mode optical fiber is one of the N modes; and a mode that is of any single-mode optical fiber and that is coupled to the non-single-mode optical fiber is one of the N modes, and the mode that is of the non-single-mode optical fiber and that is coupled to any single-mode optical fiber is different from the mode that is of the single-mode optical fiber and that is coupled to the non-single-mode optical fiber.

When the optical fiber signal mode conversion apparatus in the foregoing technical solution is used, the optical fiber signal mode conversion apparatus may form a cyclic mode conversion apparatus, to implement signal mode cyclic conversion when being used in an optical fiber transmission system. When the optical fiber signal mode conversion apparatus is applied to mode cyclic conversion, compensation for a group delay in a differential mode may be implemented, and a signal crosstalk may be further reduced.

In a possible implementation of the first aspect, a plurality of first coupling regions are successively arranged along an axial direction of the non-single-mode optical fiber, and a plurality of second coupling regions are successively arranged along the axial direction of the non-single-mode optical fiber.

According to a second aspect, this application further provides an optical fiber signal mode conversion method, applied to the optical fiber signal mode conversion apparatus. The method includes: when the signal in the first mode in the non-single-mode optical fiber is transmitted to the first coupling region, decoupling the signal in the first mode to the fundamental mode channel of the single-mode optical fiber, and transmitting a decoupled signal in the single-mode optical fiber as a fundamental mode signal; and when the fundamental mode signal in the single-mode optical fiber is transmitted to the second coupling region, coupling the fundamental mode signal of the single-mode optical fiber to the second mode channel of the non-single-mode optical fiber, and transmitting a coupled signal in the non-single-mode optical fiber in the second mode.

According to the optical fiber signal mode conversion method provided in this embodiment of this application, because the effective refractive index of the fundamental mode signal of the single-mode optical fiber in the first coupling region is equal to the effective refractive index of the signal in the first mode, when the signal in the first mode that is transmitted in the non-single-mode optical fiber is transmitted to the first coupling region, the signal in the first mode is decoupled to the fundamental mode channel of the single-mode optical fiber according to a mode matching condition, and is transmitted in the single-mode optical fiber as a fundamental mode signal. In addition, because the effective refractive index of the fundamental mode signal of the single-mode optical fiber in the second coupling region is equal to the effective refractive index of the signal in the second mode, when the fundamental mode signal in the single-mode optical fiber is transmitted to the second coupling region, the fundamental mode signal of the single-mode optical fiber is coupled to the second mode channel of the non-single-mode optical fiber according to a mode matching condition, thereby converting the first mode into the second mode.

According to a third aspect, this application further provides an optical fiber transmission system. The optical fiber transmission system includes: transmission optical fibers, where the transmission optical fibers include a first transmission optical fiber and a second transmission optical fiber, and the first transmission optical fiber and the second transmission optical fiber each include a first mode channel and a second mode channel. The foregoing optical fiber signal mode conversion apparatus is disposed at a node between the first transmission optical fiber and the second transmission optical fiber. An optical inlet of the non-single-mode optical fiber is opposite to an optical outlet of the first transmission optical fiber, and an optical outlet of the non-single-mode optical fiber is opposite to an optical inlet of the second transmission optical fiber.

The optical fiber transmission system provided in this embodiment of this application includes the optical fiber signal mode conversion apparatus in any of the foregoing technical solutions. In this way, a signal in a first mode on the first transmission optical fiber can be converted to a second mode channel of the second transmission optical fiber by using the optical fiber signal mode conversion apparatus, to be transmitted in the second transmission optical fiber in a second mode. In addition, the optical fiber transmission system provided in this embodiment of this application can resolve a same technical problem as the optical fiber signal mode conversion apparatus described in the foregoing technical solutions, and achieve a same expected effect.

In a possible implementation of the third aspect, the optical fiber transmission system is configured to transmit signals in N modes, where N is an integer greater than or equal to 2; there are N segments of transmission optical fibers, axial lengths of the N segments of transmission optical fibers are all equal, each segment of transmission optical fiber has N mode channels, and the N mode channels are in a one-to-one correspondence with the N modes; and there are N-1 optical fiber signal mode conversion apparatuses, and one optical fiber signal mode conversion apparatus is disposed at a node between two segments of transmission optical fibers. The optical fiber transmission system can compensate for a group delay in a differential mode.

BRIEF DESCRIPTION OF DRAWINGS

FIG. 5b is a schematic diagram of a cross section of a coupling region in FIG. 5a;

FIG. 7b is a schematic diagram of a cross section of a first coupling region in FIG. 7a;

FIG. 7c is a schematic diagram of a cross section of a second coupling region in FIG. 7a:

FIG. 8b is a schematic diagram of a cross section of a second coupling region in FIG. 8a;

FIG. 9b is a schematic diagram of a cross section of a second coupling region in FIG. 9a;

FIG. 15b is a schematic diagram of a cross section of a coupling region in FIG. 15a;

FIG. 15c is a schematic diagram of a cross section of a coupling region in FIG. 15a:

DESCRIPTION OF EMBODIMENTS

Embodiments of this application relate to an optical fiber transmission system, an optical fiber signal mode conversion apparatus, and an optical fiber signal mode conversion method. The following describes in detail the optical fiber transmission system, the optical fiber signal mode conversion apparatus, and the optical fiber signal mode conversion method with reference to accompanying drawings.

In embodiments of this application, non-single-mode includes few-mode and multi-mode. In the following embodiments, a few-mode optical fiber and few-mode signal transmission are used as examples.

Figure 1:
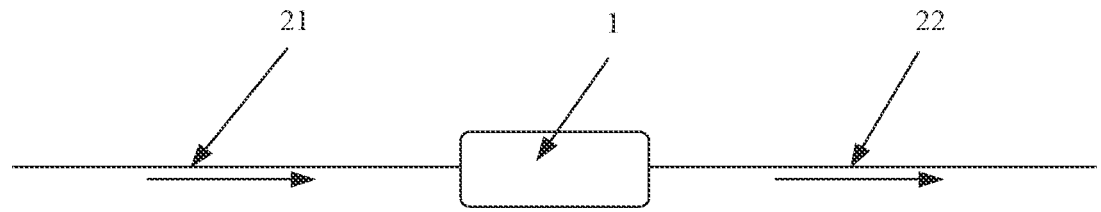
FIG. 1 is a block diagram of a structure of an optical fiber transmission system according to an embodiment of this application.

An embodiment of this application provides an optical fiber transmission system. Refer to FIG. 1. The optical fiber transmission system includes a first transmission optical fiber 21 and a second transmission optical fiber 22. The first transmission optical fiber 21 and the second transmission optical fiber 22 each include a first mode channel and a second mode channel. The first mode channel is configured to transmit a signal in a first mode. The second mode channel is configured to transmit a signal in a second mode. An optical fiber signal mode conversion apparatus 1 is disposed at a node between the first transmission optical fiber 21 and the second transmission optical fiber 22. The optical fiber signal mode conversion apparatus 1 is configured to convert the first mode into the second mode.

Figure 2:
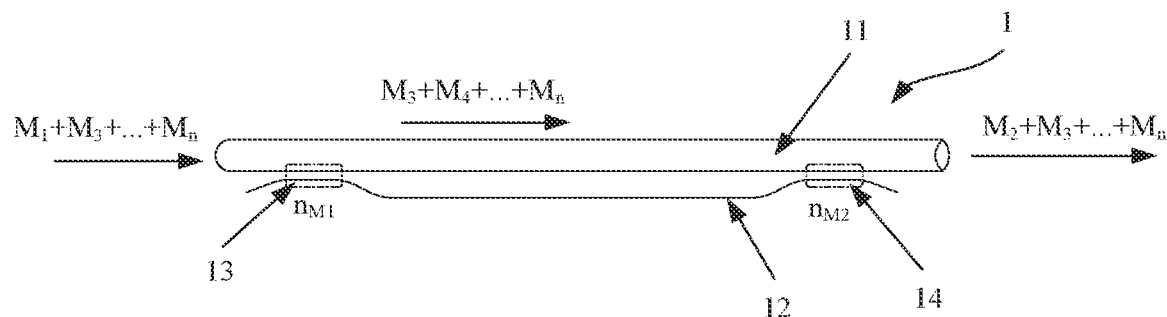
FIG. 2 is a schematic diagram of a structure of an optical fiber signal mode conversion apparatus according to an embodiment of this application.

An embodiment of this application provides an optical fiber signal mode conversion apparatus. Refer to FIG. 2. The optical fiber signal mode conversion apparatus 1 includes a few-mode optical fiber 11 and a single-mode optical fiber 12. The few-mode optical fiber 11 includes a first mode channel and a second mode channel. The first mode channel is configured to transmit a signal in a first mode. The second mode channel is configured to transmit a signal in a second mode. The single-mode optical fiber 12 forms, with the few-mode optical fiber 11, a first coupling region 13 and a second coupling region 14 along a signal transmission direction in the few-mode optical fiber 11. An effective refractive index of a fundamental mode signal of the single-mode optical fiber 12 in the first coupling region 13 is equal to an effective refractive index of the signal in the first mode, and the signal in the first mode may be coupled to a fundamental mode channel of the single-mode optical fiber 12. An effective refractive index of the fundamental mode signal of the single-mode optical fiber 12 in the second coupling region 14 is equal to an effective refractive index of the signal in the second mode, and the fundamental mode signal of the single-mode optical fiber 12 may be coupled to the second mode channel.

Because the effective refractive index of the fundamental mode signal of the single-mode optical fiber 12 in the first coupling region 13 is equal to the effective refractive index of the signal in the first mode, the signal in the first mode may be coupled to the fundamental mode channel of the single-mode optical fiber 12. In this way, the first mode of the few-mode optical fiber 11 and a fundamental mode of the single-mode optical fiber 12 meet a mode matching condition in the first coupling region 13, and the signal in the first mode in the few-mode optical fiber 11 can be decoupled to the single-mode optical fiber 12 and be transmitted in the single-mode optical fiber 12 in the fundamental mode. In addition, the effective refractive index of the fundamental mode signal of the single-mode optical fiber 12 in the first coupling region 13 is different from the effective refractive index of the fundamental mode signal in the second coupling region 14, and the effective refractive index of the fundamental mode signal of the single-mode optical fiber 12 in the second coupling region 14 is equal to the effective refractive index of the signal in the second mode. In this way, the fundamental mode of the single-mode optical fiber 12 and the second mode of the few-mode optical fiber 11 meet a mode matching condition in the second coupling region 14, so that the fundamental mode signal in the single-mode optical fiber 12 is coupled to the second mode channel of the few-mode optical fiber 11 and is transmitted in the few-mode optical fiber 11 in the second mode. Therefore, the first mode is converted into the second mode.

When the optical fiber signal mode conversion apparatus provided in this embodiment is used in an optical fiber transmission system, all optical fiber transmission (transmission optical fibers and the mode conversion apparatus are all optical fibers) may be implemented, and the optical fiber signal mode conversion apparatus can be well compatible with the optical fiber transmission system. One mode can be converted into another mode by using only one few-mode optical fiber 11 and one single-mode optical fiber 12. Therefore, a structure is simple and costs of the transmission system are greatly reduced. In addition, one few-mode optical fiber 11 and one single-mode optical fiber 12 form only two coupling regions, so that an insertion loss is small.

As shown in FIG. 2, the optical fiber signal mode conversion apparatus is configured to convert an $M_1$ mode into an $M_2$ mode (an optical inlet of the few-mode optical fiber 11 is $M_1+M_3+ \ldots +M_n$, and an optical outlet of the few-mode optical fiber 11 is $M_2+M_3+ \ldots +M_n$). In this case, the few-mode optical fiber 11 includes an $M_1$ mode channel, an $M_2$ mode channel, an $M_3$ mode channel, ..., and an $M_n$ mode channel. The effective refractive index of the fundamental mode signal of the single-mode optical fiber 12 in the first coupling region 13 is equal to an effective refractive index $n_{M1}$ of a signal in the $M_1$ mode, and the signal in the $M_1$ mode may be coupled to the fundamental mode channel of the single-mode optical fiber 12. The effective refractive index of the fundamental mode signal of the single-mode optical fiber 12 in the second coupling region 14 is equal to an effective refractive index $n_{M2}$ of a signal in the $M_2$ mode, and the fundamental mode signal of the single-mode optical fiber 12 may be coupled to the $M_2$ mode channel. In this way, the optical fiber signal mode conversion apparatus can convert the $M_1$ mode into the $M_2$ mode.

Figure 3A:
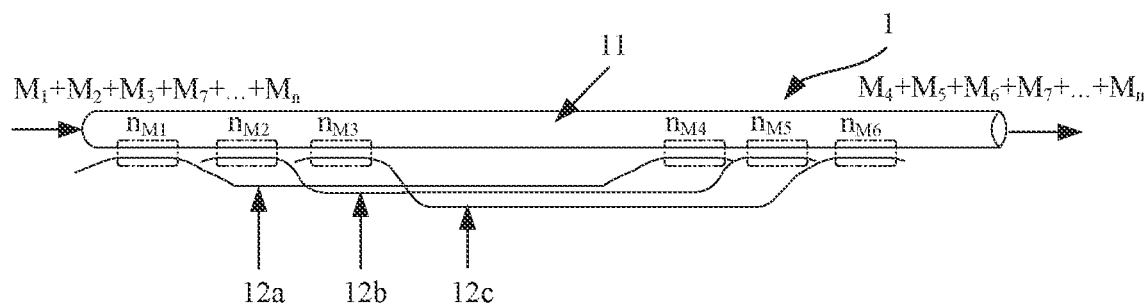
FIG. 3a is a schematic diagram of a structure of an optical fiber signal mode conversion apparatus according to an embodiment of this application.

In some scenarios, a plurality of modes need to be converted into a plurality of modes. An embodiment of this application provides an optical fiber signal mode conversion apparatus, as shown in FIG. 3a. A service requirement is that $M_1$, $M_2$, and $M_3$ modes are converted into $M_4$, $M_5$, and $M_6$ modes (an optical inlet of a few-mode optical fiber 11 is $M_1+M_2+M_3+M_7+ \ldots +M_n$, and an optical outlet of the few-mode optical fiber 11 is $M_4+M_5+M_6+M_7+ \ldots +M_n$), and the few-mode optical fiber 11 includes an $M_1$ mode channel, an $M_2$ mode channel, an $M_3$ mode channel, ..., and an $M_n$ mode channel. Single-mode optical fibers include a single-mode optical fiber 12a, a single-mode optical fiber 12b, and a single-mode optical fiber 12c. The single-mode optical fiber 12a, the single-mode optical fiber 12b, and the single-mode optical fiber 12c each form a first coupling region and a second coupling region with the few-mode optical fiber 11. An effective refractive index of a fundamental mode signal of the single-mode optical fiber 12a in the first coupling region is equal to an effective refractive index $n_{M1}$ of a signal in the $M_1$ mode, and the signal in the $M_1$ mode may be coupled to a fundamental mode channel of the single-mode optical fiber 12a. An effective refractive index of the fundamental mode signal of the single-mode optical fiber 12a in the second coupling region is equal to an effective refractive index $n_{M4}$ of a signal in the $M_4$ mode, and the fundamental mode signal of the single-mode optical fiber 12a may be coupled to the $M_4$ mode channel. An effective refractive index of a fundamental mode signal of the single-mode optical fiber 12b in the first coupling region is equal to an effective refractive index $n_{M2}$ of a signal in the $M_2$ mode, and the signal in the $M_2$ mode may be coupled to a fundamental mode channel of the single-mode optical fiber 12b. An effective refractive index of the fundamental mode signal of the single-mode optical fiber 12b in the second coupling region is equal to an effective refractive index $n_{M5}$ of a signal in the $M_5$ mode, and the fundamental mode signal of the single-mode optical fiber 12b may be coupled to the $M_5$ mode channel. An effective refractive index of a fundamental mode signal of the single-mode optical fiber 12c in the first coupling region is equal to an effective refractive index $n_{M3}$ of a signal in the $M_3$ mode, and the signal in the $M_3$ mode may be coupled to a fundamental mode channel of the single-mode optical fiber 12c. An effective refractive index of the fundamental mode signal of the single-mode optical fiber 12c in the second coupling region is equal to an effective refractive index $n_{M6}$ of a signal in the $M_6$ mode, and the fundamental mode signal of the single-mode optical fiber 12c may be coupled to the $M_6$ mode channel. In this way, the optical fiber signal mode conversion apparatus can convert the $M_1$ mode, the $M_2$ mode, and the $M_3$ mode into the $M_4$ mode, the $M_5$ mode, and the $M_6$ mode.

It should be noted that the foregoing conversion manner of the optical fiber signal mode conversion apparatus shown in FIG. 3a is not limited, and may alternatively be that the effective refractive indexes of the fundamental mode signals of the single-mode optical fibers 12a, 12b, and 12c in the first coupling regions are respectively equal to the effective refractive indexes of the signals in the $M_1$, $M_2$, and $M_3$ modes, and the effective refractive indexes of the fundamental mode signals of the single-mode optical fibers 12a, 12b, and 12c in the second coupling regions are respectively equal to the effective refractive indexes of the signals in the $M_5$, $M_6$, and $M_4$ modes.

Figure 3B:
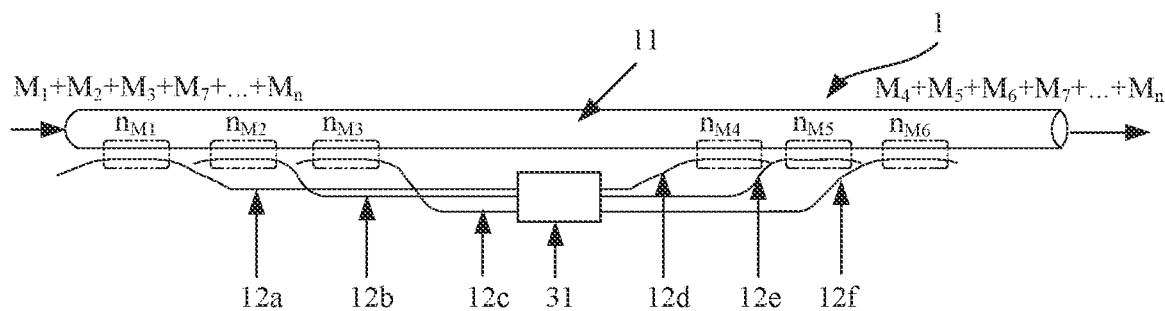
FIG. 3b is a schematic diagram of a structure of an optical fiber signal mode conversion apparatus according to an embodiment of this application.

In some scenarios, a plurality of modes need to be dynamically converted into a plurality of modes in real time or at a high frequency, and a conversion correspondence between the plurality of modes and the plurality of modes in previous dynamic conversion is different from a conversion correspondence between the plurality of modes and the plurality of modes in next dynamic conversion. An embodiment of this application provides an optical fiber signal mode conversion apparatus, as shown in FIG. 3b. A service requirement is that $M_1$, $M_2$, and $M_3$ modes are converted into $M_4$, $M_5$, and $M_6$ modes (an optical inlet of a few-mode optical fiber 11 is $M_1+M_2+M_3+M_7+ \ldots +M_n$, and an optical outlet of the few-mode optical fiber 11 is $M_4+M_5+M_6+M_7+ \ldots +M_n$), and the few-mode optical fiber 11 includes an $M_1$ mode channel, an $M_2$ mode channel, an $M_3$ mode channel, ..., and an $M_n$ mode channel. Single-mode optical fibers include a single-mode optical fiber 12a, a single-mode optical fiber 12b, a single-mode optical fiber 12c, a single-mode optical fiber 12d, a single-mode optical fiber 12e, and a single-mode optical fiber 12f. The single-mode optical fiber 12a, the single-mode optical fiber 12b, and the single-mode optical fiber 12c each form a first coupling region with the few-mode optical fiber 11, and the single-mode optical fiber 12d, the single-mode optical fiber 12e, and the single-mode optical fiber 12f each form a second coupling region with the few-mode optical fiber 11. An effective refractive index of a fundamental mode signal of the single-mode optical fiber 12a in the first coupling region is equal to an effective refractive index $n_{M1}$ of a signal in the $M_1$ mode, and the signal in the $M_1$ mode may be coupled to a fundamental mode channel of the single-mode optical fiber 12a. An effective refractive index of a fundamental mode signal of the single-mode optical fiber 12b in the first coupling region is equal to an effective refractive index $n_{M2}$ of a signal in the $M_2$ mode, and the signal in the $M_2$ mode may be coupled to a fundamental mode channel of the single-mode optical fiber 12b. An effective refractive index of a fundamental mode signal of the single-mode optical fiber 12c in the first coupling region is equal to an effective refractive index $n_{M3}$ of a signal in the $M_3$ mode, and the signal in the $M_3$ mode may be coupled to a fundamental mode channel of the single-mode optical fiber 12c. An effective refractive index of a fundamental mode signal of the single-mode optical fiber 12d in the second coupling region is equal to an effective refractive index $n_{M4}$ of a signal in the $M_4$ mode, and the fundamental mode signal of the single-mode optical fiber 12d may be coupled to the $M_4$ mode channel. An effective refractive index of a fundamental mode signal of the single-mode optical fiber 12e in the second coupling region is equal to an effective refractive index $n_{M5}$ of a signal in the $M_5$ mode, and the fundamental mode signal of the single-mode optical fiber 12e may be coupled to the $M_5$ mode channel. An effective refractive index of a fundamental mode signal of the single-mode optical fiber 12f in the second coupling region is equal to an effective refractive index $n_{M6}$ of a signal in the $M_6$ mode, and the fundamental mode signal of the single-mode optical fiber 12f may be coupled to the $M_6$ mode channel. There is a dynamic optical switching apparatus 31 between the single-mode optical fibers 12a. 12b, and 12c and the single-mode optical fibers 12d, 12e, and 12f, and a function of the dynamic optical switching apparatus 31 is to respectively switch, to the single-mode optical fiber 12d, 12e, or 12f, an optical signal transmitted in the single-mode optical fiber 12a. 12b, or 12c, where a switching correspondence between the single-mode optical fiber 12a, 12b, or 12c and the single-mode optical fiber 12d, 12e, or 12f may be dynamically changed in real time or at a high frequency. In this way, the optical fiber signal mode conversion apparatus can respectively convert the $M_1$ mode, the $M_2$ mode, or the $M_3$ mode into the $M_4$ mode, the $M_5$ mode, or the $M_6$ mode, and a mode conversion correspondence can be dynamically changed in real time or at a high frequency. For example, when the dynamic optical switching apparatus 31 is in an operating state 1, the $M_1$ mode is converted into the $M_4$ mode, the $M_2$ mode is converted into the $M_5$ mode, and the $M_3$ mode is converted into the $M_6$ mode. After the dynamic optical switching apparatus 31 dynamically switches to an operating state 2, the $M_1$ mode is converted into the $M_5$ mode, the $M_2$ mode is converted into the $M_6$ mode, and the $M_3$ mode is converted into the $M_4$ mode. It should be noted that the optical fiber signal mode conversion apparatus shown in FIG. 3b may perform conversion between three pairs of modes at the same time, or may perform conversion between two pairs, four pairs, or more pairs of modes at the same time. This is not limited.

Usually, a refractive index of a core of the single-mode optical fiber 12 in a non-coupling region is between refractive indexes of the core in the two coupling regions. It is assumed that the refractive index of the core of the single-mode optical fiber 12 in the first coupling region is a first refractive index, the refractive index of the core of the single-mode optical fiber 12 in the second coupling region is a second refractive index, the refractive index of the core of the single-mode optical fiber 12 in the non-coupling region between the first coupling region and the second coupling region is a third refractive index, and the third refractive index is between the first refractive index and the second refractive index.

Figure 4A:
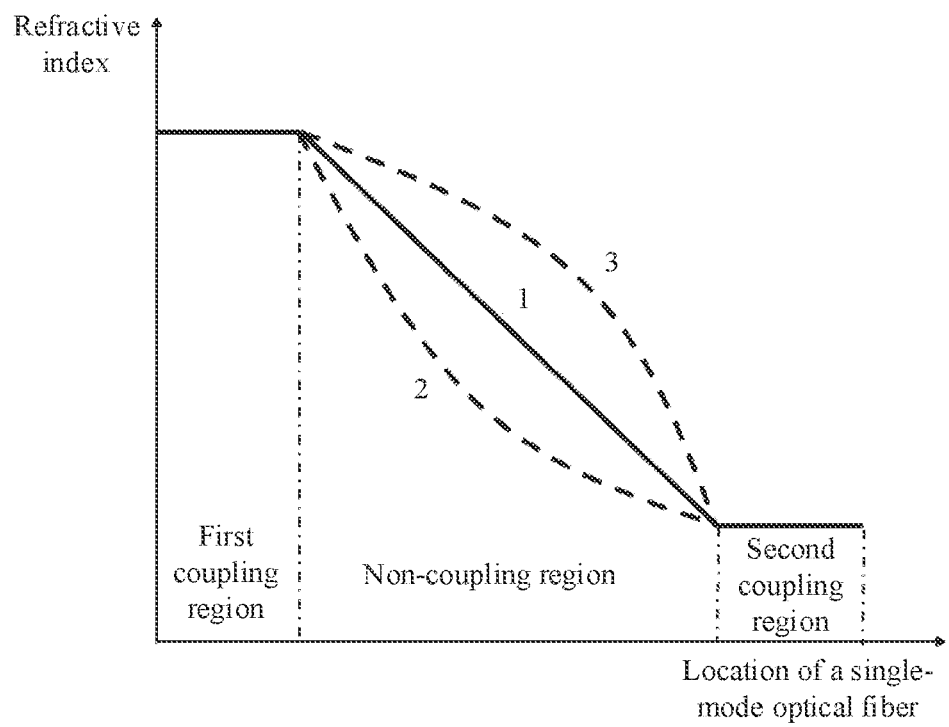
FIG. 4a is a schematic diagram of distribution of a refractive index of a single-mode optical fiber according to an embodiment of this application.
Figure 4B:
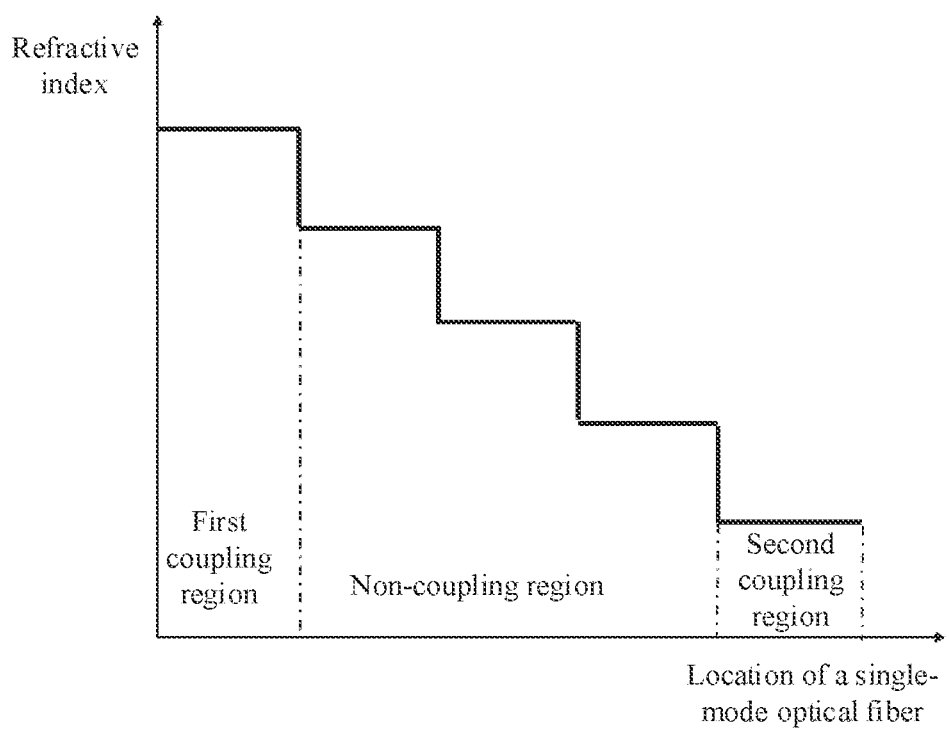
FIG. 4b is a schematic diagram of distribution of a refractive index of a single-mode optical fiber according to an embodiment of this application.

That the third refractive index is between the first refractive index and the second refractive index is implemented in a plurality of implementations. Refer to FIG. 4a and FIG. 4b. When the first refractive index of the core of the single-mode optical fiber in the first coupling region is greater than the second refractive index of the core of the single-mode optical fiber in the second coupling region, the third refractive index shows a gradient transition trend, for example, may show a linear gradient transition (a straight line 1 in FIG. 4a), a non-linear gradient transition (a curve 2 and a curve 3 in FIG. 4a), or a step transition shown in FIG. 4b.

Figure 5A:
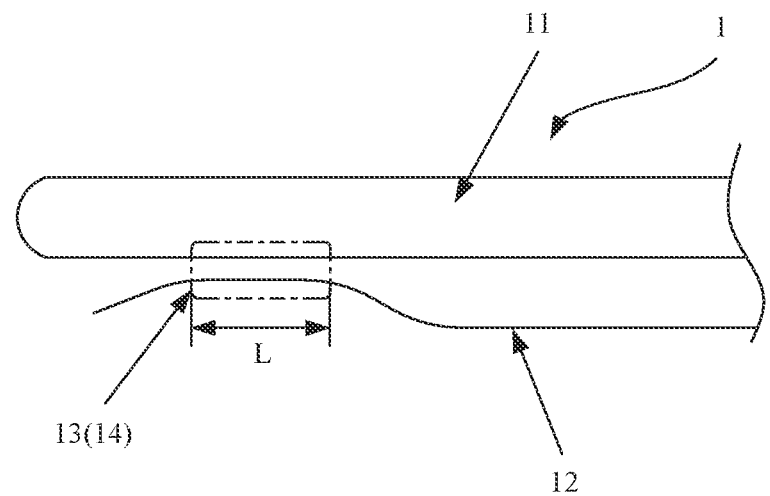
FIG. 5a is a schematic diagram of a local part of an optical fiber signal mode conversion apparatus according to an embodiment of this application.

To shorten a length size of the few-mode optical fiber 11 to reduce a volume of the conversion apparatus, refer to FIG. 5a, a length L of the first coupling region 13 is equal to a coupling length for the signal in the first mode to be coupled to the fundamental mode channel of the single-mode optical fiber. The coupling length refers to a shortest coupling length when optical signal energy is completely transferred from the few-mode optical fiber 11 to the single-mode optical fiber 12 for the first time. The length L of the first coupling region 13 is controlled to be equal to the coupling length for the signal in the first mode to be coupled to the fundamental mode channel of the single-mode optical fiber, and not to be an integer multiple, greater than 1, of the coupling length. In this way, the length size of the few-mode optical fiber can be shortened. Especially, when there are a plurality of first coupling regions, an effect of shortening the length size of the few-mode optical fiber is more obvious.

A length L of the second coupling region 14 should also be controlled to be equal to a coupling length for the fundamental mode signal of the single-mode optical fiber to be coupled to the second mode channel. The coupling length refers to a shortest coupling length when the optical signal energy is completely transferred from the single-mode optical fiber 12 to the few-mode optical fiber 11 for the first time.

In this embodiment of this application, in a radial direction of an optical fiber, the single-mode optical fiber 12 and the few-mode optical fiber 11 that are involved each include a core, a cladding, and a coating layer that are successively disposed from inside to outside. The core completes transmission of an optical signal. A refractive index of the cladding is different from that of the core. The optical signal is enclosed in the core for transmission, to protect the core. The coating layer serves as a protection structure of the core and the cladding.

Embodiments of this application further provide a manner of forming a coupling region. In the first coupling region, the few-mode optical fiber 11 and the single-mode optical fiber 12 are arranged in parallel, and the cladding of the few-mode optical fiber 11 and the cladding of the single-mode optical fiber 12 are spliced or are bonded through side polishing. In the second coupling region, the few-mode optical fiber 11 and the single-mode optical fiber 12 are also arranged in parallel, and the cladding of the few-mode optical fiber 11 and the cladding of the single-mode optical fiber 12 are spliced or are bonded through side polishing. Certainly, the few-mode optical fiber 11 and the single-mode optical fiber 12 may be alternatively connected through another structure.

Figure 5B:
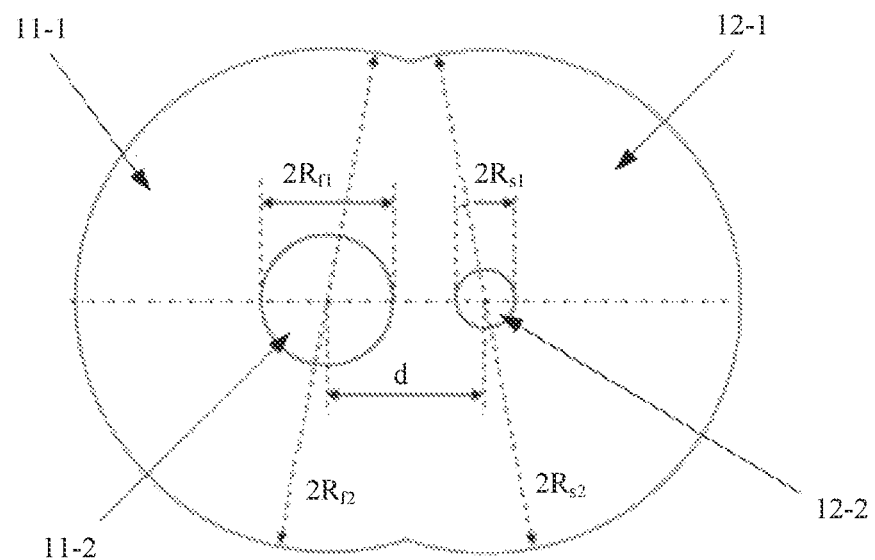

FIG. 5b is a schematic diagram of a cross section of a coupling region. A distance between a center of the core 11-2 of the few-mode optical fiber 11 and a center of the core 12-2 of the single-mode optical fiber 12 is d, and a value range of the distance d is usually $d \in [R_{f1}+R_{s1}, R_{f2}+R_{s2}]$, where $R_{f1}$ is a radius of the core 11-2 of the few-mode optical fiber 11, $R_{s1}$ is a radius of the core 12-2 of the single-mode optical fiber 12, $R_{f2}$ is a radius of the cladding 11-1 of the few-mode optical fiber 11, and $R_{s2}$ is a radius of the cladding 12-1 of the single-mode optical fiber 12.

Usually, a maximum coupling efficiency when decoupling is performed in the first coupling region is determined based on a first mode that needs to be converted, then the distance d between the center of the core of the few-mode optical fiber and the center of the core of the single-mode optical fiber in the first coupling region is determined based on the maximum coupling efficiency, and a coupling length of the first coupling region is determined based on a value of d. Similarly, a maximum coupling efficiency when decoupling is performed in the second coupling region is determined based on a second mode that needs to be converted, then the distance d between the center of the core of the few-mode optical fiber and the center of the core of the single-mode optical fiber in the second coupling region is determined based on the maximum coupling efficiency, and a coupling length of the second coupling region is determined based on a value of d. A specific parameter design is not described in detail again.

Figure 6A:
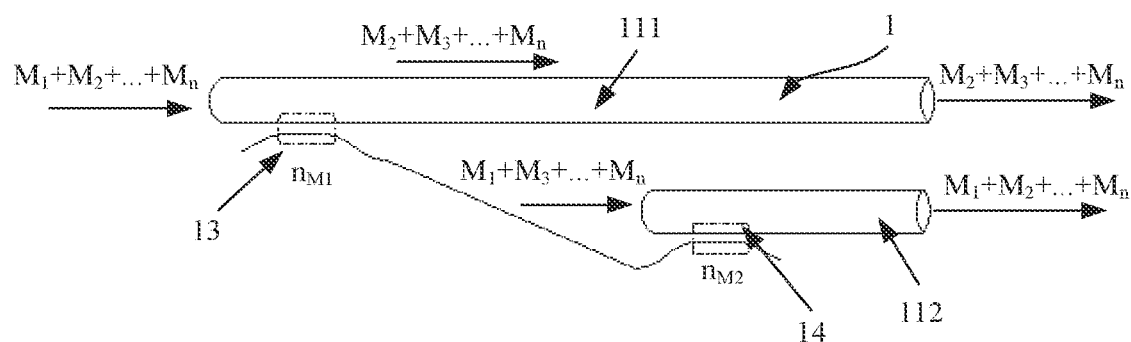
FIG. 6a is a schematic diagram of a structure of an optical fiber signal mode conversion apparatus according to an embodiment of this application.

An embodiment of this application further provides a mode conversion manner. Refer to FIG. 6a. A few-mode optical fiber includes a first few-mode optical fiber 111 and a second few-mode optical fiber 112, where a first coupling region 13 is formed between a single-mode optical fiber 12 and the first few-mode optical fiber 111, and a second coupling region 14 is formed between the single-mode optical fiber 12 and the second few-mode optical fiber 112. In other words, a converted second mode may be converted to another few-mode optical fiber, to be used in a mode add/drop multiplexing scenario.

Figure 6B:
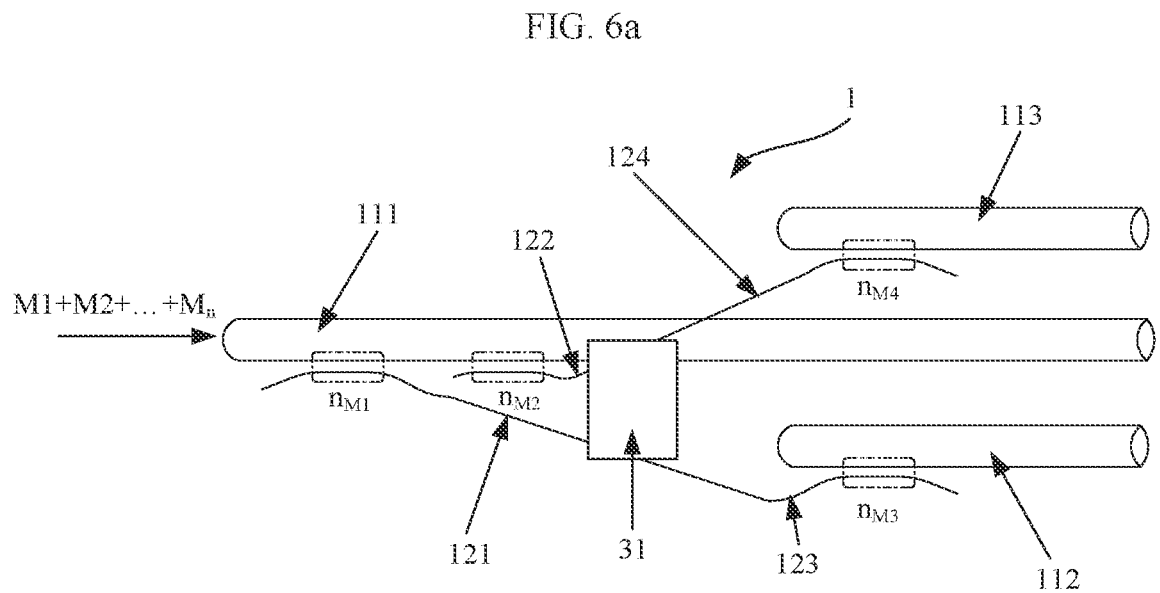
FIG. 6b is a schematic diagram of a structure of an optical fiber signal mode conversion apparatus according to an embodiment of this application.

Alternatively, more than two modes in one few-mode optical fiber may be dynamically converted into a plurality of modes in more than two other few-mode optical fibers. For example, refer to FIG. 6b. A few-mode optical fiber includes a first few-mode optical fiber 111, a second few-mode optical fiber 112, and a third few-mode optical fiber 113. Single-mode optical fibers include a single-mode optical fiber 121, a single-mode optical fiber 122, a single-mode optical fiber 123, and a single-mode optical fiber 124. There is a dynamic optical switching apparatus 31 between the single-mode optical fibers 121 and 122 and the single-mode optical fibers 123 and 124, and a function of the dynamic optical switching apparatus 31 is to respectively switch, to the single-mode optical fiber 123 or 124, an optical signal transmitted in the single-mode optical fiber 121 or 122, where a switching correspondence between the single-mode optical fiber 121 or 122 and the single-mode optical fiber 123 or 124 may be dynamically changed in real time or at a high frequency. In this way, the optical fiber signal mode conversion apparatus can respectively convert an $M_1$ mode or an $M_2$ mode in the first few-mode optical fiber 111 into an $M_3$ mode in the second few-mode optical fiber 112 or an $M_4$ mode in the third few-mode optical fiber 113, and a mode conversion correspondence can be dynamically changed in real time or at a high frequency. In other words, a plurality of modes in one few-mode optical fiber may be dynamically converted into a plurality of modes in a plurality of other few-mode optical fibers, to be used in a mode add/drop multiplexing scenario in which a dynamic mode is adjustable.

When the first mode and the second mode are two modes in a group of degenerate modes, the optical fiber signal mode conversion apparatus provided in this embodiment of this application may still convert the first mode into the second mode. The effective refractive index of the fundamental mode signal of the single-mode optical fiber 12 in the first coupling region 13 is equal to the effective refractive index of the fundamental mode signal of the single-mode optical fiber 12 in the second coupling region 14. In addition, the center of the core of the few-mode optical fiber 11 and the center of the core of the single-mode optical fiber 12 are on a first straight line along a cross section of the few-mode optical fiber in the first coupling region 13; and the center of the core of the few-mode optical fiber 11 and the center of the core of the single-mode optical fiber 12 are on a second straight line along the cross section of the few-mode optical fiber 11 in the second coupling region 14. An included angle between the first straight line and the second straight line is equal to a phase difference between the first mode and the second mode. Therefore, the optical fiber signal mode conversion apparatus provided in this embodiment of this application implements mode conversion in the degenerate modes.

It should be noted that, that an included angle between the first straight line and the second straight line is equal to a phase difference between the first mode and the second mode means that the included angle between the first straight line and the second straight line is exactly equal to the phase difference between the first mode and the second mode, and that the included angle between the first straight line and the second straight line is close to the phase difference between the first mode and the second mode also falls within the protection scope of this application.

Figure 7A:
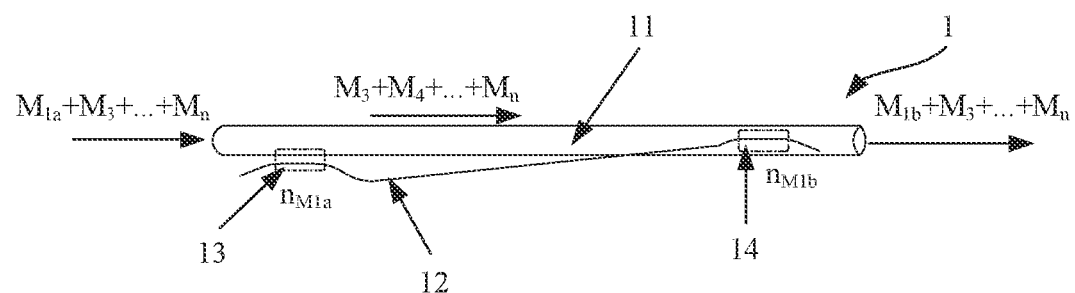
FIG. 7a is a schematic diagram of a structure of an optical fiber signal mode conversion apparatus according to an embodiment of this application.
Figure 7B:
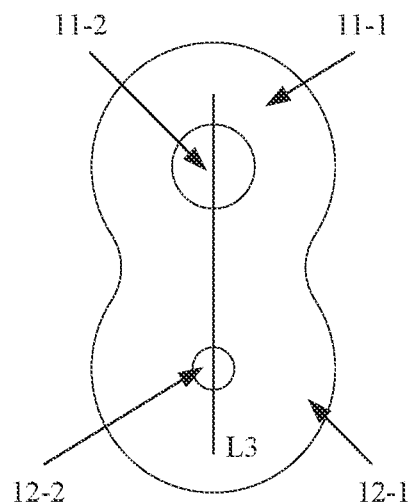
Figure 7C:
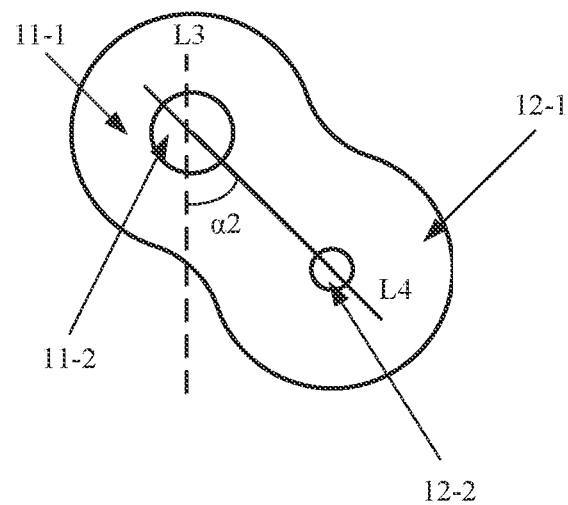

Refer to FIG. 7a. The optical fiber signal mode conversion apparatus is configured to convert an $M_{1a}$ mode into an $M_{1b}$ mode, where the $M_{1a}$ mode and the $M_{1b}$ mode are two modes in a degenerate mode $M_1$, and a phase difference $\varphi$ between the $M_{1a}$ mode and the $M_{1b}$ mode is 45°. The effective refractive index of the fundamental mode signal of the single-mode optical fiber 12 in the first coupling region 13 and the effective refractive index of the fundamental mode signal of the single-mode optical fiber 12 in the second coupling region 14 are equal, and both are equal to an effective refractive index of a signal in the $M_1$ mode ($n_{M1a}=n_{M1b}$). Refer to FIG. 7b. The center of the core 11-2 of the few-mode optical fiber 11 and the center of the core 12-2 of the single-mode optical fiber 12 are on the first straight line L3 along the cross section of the few-mode optical fiber in the first coupling region 13. Refer to FIG. 7c. The center of the core 11-2 of the few-mode optical fiber 11 and the center of the core 12-2 of the single-mode optical fiber 12 are on the second straight line L4 along the cross section of the few-mode optical fiber in the second coupling region 14. The included angle $\alpha2$ between the first straight line L3 and the second straight line L4 is equal to the phase difference $\varphi$ between the $M_{1a}$ mode and the $M_{1b}$ mode, that is, $\alpha2=45°$.

If the second mode is a degenerate mode and the second mode includes a first submode and a second submode, when the optical fiber signal mode conversion apparatus is configured to convert the first mode into the first submode, the effective refractive index of the fundamental mode signal of the single-mode optical fiber in the second coupling region is $n_1$; when the optical fiber signal mode conversion apparatus is configured to convert the first mode into the second submode, the effective refractive index of the fundamental mode signal of the single-mode optical fiber in the second coupling region is $n_2$; and $n_1=n_2$. When the optical fiber signal mode conversion apparatus is configured to convert the first mode into the first submode, the center of the core of the few-mode optical fiber and the center of the core of the single-mode optical fiber are on a third straight line along the cross section of the few-mode optical fiber in the second coupling region; when the optical fiber signal mode conversion apparatus is configured to convert the first mode into the second submode, the center of the core of the few-mode optical fiber and the center of the core of the single-mode optical fiber are on a fourth straight line along the cross section of the few-mode optical fiber in the second coupling region; and an included angle between the third straight line and the fourth straight line is equal to a phase difference between the first submode and the second submode. Therefore, the optical fiber signal mode conversion apparatus provided in this embodiment of this application can implement mode differentiation in the degenerate mode.

It should be noted that, that an included angle between the third straight line and the fourth straight line is equal to a phase difference between the first submode and the second submode means that the included angle between the third straight line and the fourth straight line is exactly equal to the phase difference between the first submode and the second submode, and that the included angle between the third straight line and the fourth straight line is close to the phase difference between the first submode and the second submode also falls within the protection scope of this application.

Figure 8A:
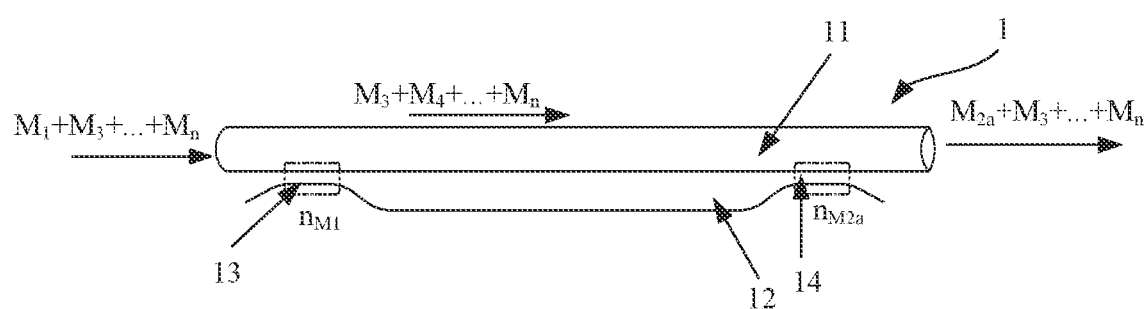
FIG. 8a is a schematic diagram of a structure of an optical fiber signal mode conversion apparatus according to an embodiment of this application.
Figure 9A:
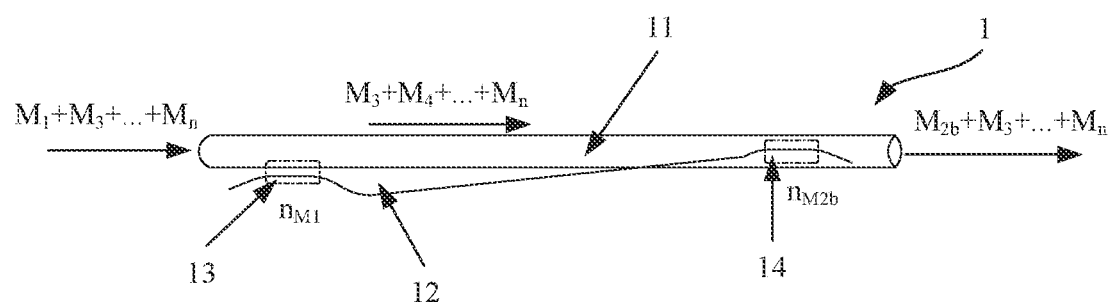
FIG. 9a is a schematic diagram of a structure of an optical fiber signal mode conversion apparatus according to an embodiment of this application.

Refer to FIG. 8a. The optical fiber signal mode conversion apparatus is configured to convert the $M_1$ mode into an $M_{2a}$ mode (the $M_{2a}$ mode and an $M_{2b}$ mode are two modes in a degenerate mode $M_2$, and a phase difference φ between the $M_{2a}$ mode and the $M_{2b}$ mode is 90°), and the effective refractive index of the fundamental mode signal of the single-mode optical fiber in the second coupling region is equal to an effective refractive index $n_{M2a}$ of a signal in the $M_{2a}$ mode. Refer to FIG. 9a. The optical fiber signal mode conversion apparatus is configured to convert the $M_1$ mode into the $M_{2b}$ mode, and the effective refractive index of the fundamental mode signal of the single-mode optical fiber in the second coupling region is $n_{M2b}$, and $n_{M2a}=n_{M2b}$.

Figure 8B:
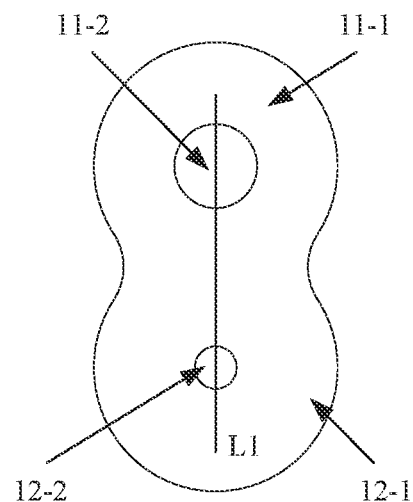
Figure 9B:
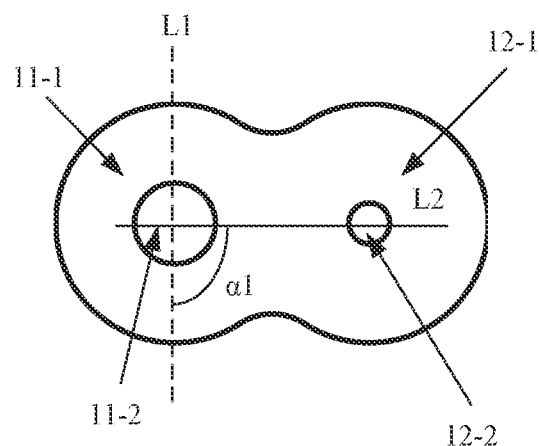

Refer to FIG. 8b. The center of the core 11-2 of the few-mode optical fiber and the center of the core 12-2 of the single-mode optical fiber are on the third straight line L1 along the cross section of the few-mode optical fiber in the second coupling region shown in FIG. 8a. Refer to FIG. 9b. The center of the core 11-2 of the few-mode optical fiber and the center of the core 12-2 of the single-mode optical fiber are on the fourth straight line L2 along the cross section of the few-mode optical fiber in the second coupling region shown in FIG. 9a. The included angle α1 between the third straight line L1 and the fourth straight line L2 is equal to the phase difference φ between the $M_{2a}$ mode and the $M_{2b}$ mode, that is, α1=90°.

The optical fiber signal mode conversion apparatus provided in this embodiment of this application may be further applied to mode cyclic conversion, to be further used in a few-mode optical fiber transmission system and a multi-mode optical fiber transmission system. For example, a transmission system transmits signals in N modes, where N is greater than 1. To implement compensation for a delay in a differential mode, there are N segments of transmission optical fibers in the transmission system, and axial lengths of the N segments of transmission optical fibers are all equal. Each segment of transmission optical fiber has N mode channels, and the N mode channels are in a one-to-one correspondence with the N modes. There are N-1 optical fiber signal mode conversion apparatuses in the transmission system, and one optical fiber signal mode conversion apparatus is disposed at a node between two segments of transmission optical fibers. A few-mode optical fiber 11 of each optical fiber signal mode conversion apparatus includes N mode channels, and the N mode channels are in a one-to-one correspondence with N modes. There are N single-mode optical fibers 12, and any single-mode optical fiber forms a first coupling region and a second coupling region with the few-mode optical fiber 11. A mode that is of the few-mode optical fiber 11 and that is coupled to any single-mode optical fiber is one of the N modes, and modes that are of the few-mode optical fiber and that are coupled to the N single-mode optical fibers are different. A mode that is of any single-mode optical fiber and that is coupled to the few-mode optical fiber is one of the N modes, and modes that are of the N single-mode optical fibers and that are coupled to the few-mode optical fiber are different. In addition, the mode that is of the few-mode optical fiber 11 and that is coupled to any single-mode optical fiber is different from the mode that is of the single-mode optical fiber and that is coupled to the few-mode optical fiber. Therefore, cyclic conversion is formed.

The following describes an optical fiber transmission system with an optical fiber signal mode conversion apparatus by using examples.

Figure 10:
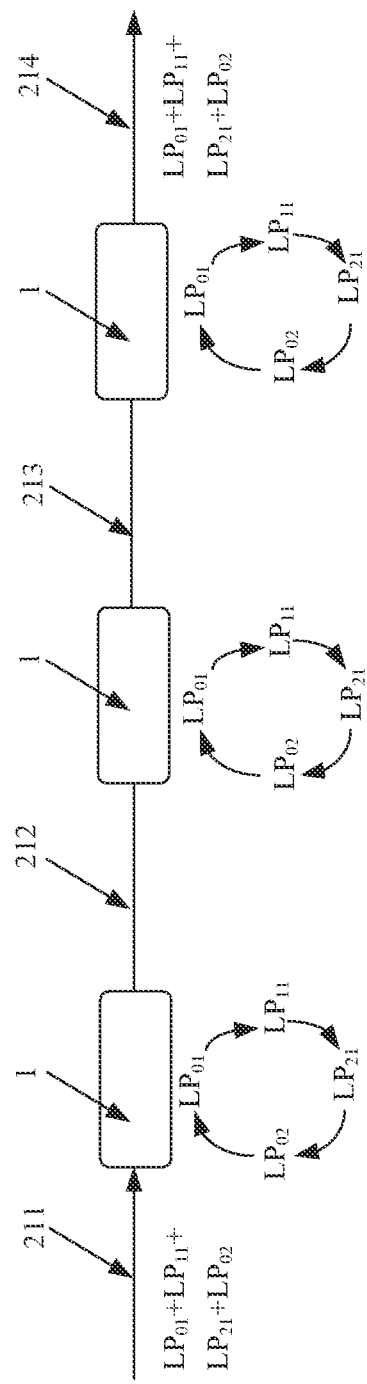
FIG. 10 is a block diagram of a structure of an optical fiber transmission system according to an embodiment of this application.

As shown in FIG. 10, an optical fiber transmission system is configured to transmit signals in $LP_{01}$, $LP_{11}$, $LP_{21}$, and $LP_{02}$ modes. Transmission optical fibers include a first transmission optical fiber 211, a second transmission optical fiber 212, a third transmission optical fiber 213, and a fourth transmission optical fiber 214. In addition, axial lengths of the first transmission optical fiber 211, the second transmission optical fiber 212, the third transmission optical fiber 213, and the fourth transmission optical fiber 214 are all equal. There are three optical fiber signal mode conversion apparatuses 1. One optical fiber signal mode conversion apparatus 1 is disposed at a node between the first transmission optical fiber 211 and the second transmission optical fiber 212. One optical fiber signal mode conversion apparatus 1 is disposed at a node between the second transmission optical fiber 212 and the third transmission optical fiber 213. One optical fiber signal mode conversion apparatus 1 is disposed at a node between the third transmission optical fiber 213 and the fourth transmission optical fiber 214. In addition, the three optical fiber signal mode conversion apparatuses 1 are of a same structure.

Figure 11:
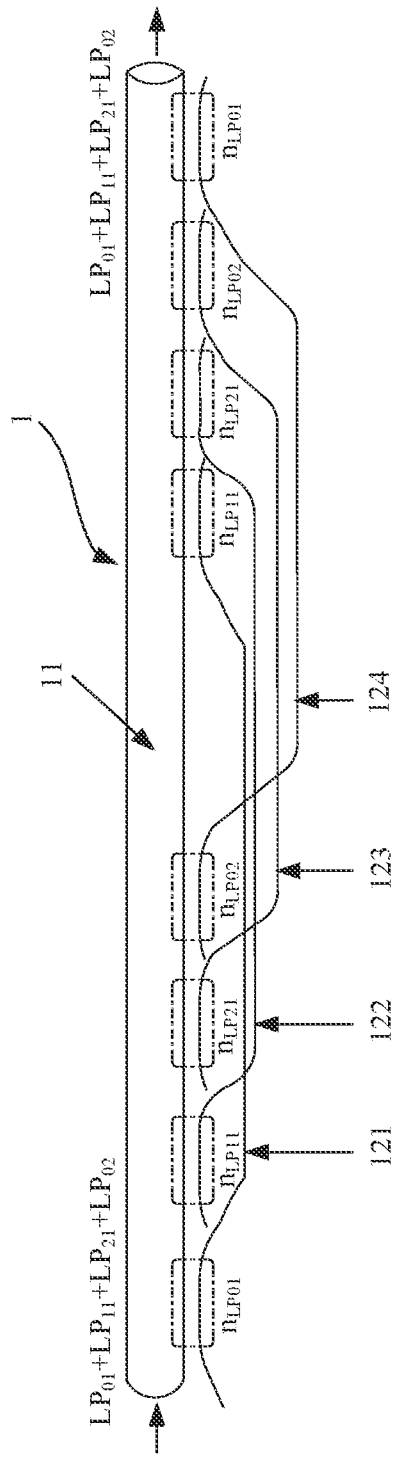
FIG. 11 is a schematic diagram of a structure of an optical fiber signal mode conversion apparatus in FIG. 10.

FIG. 11 shows an optical fiber signal mode conversion apparatus of a structure. Single-mode optical fibers include single-mode optical fibers 121, 122, 123, and 124. The single-mode optical fibers 121, 122, 123, and 124 each form a first coupling region and a second coupling region with a few-mode optical fiber 11. Effective refractive indexes of fundamental mode signals of the single-mode optical fibers 121, 122, 123, and 124 in the first coupling regions are respectively equal to effective refractive indexes $n_{LP01}$, $n_{LP11}$, $n_{LP21}$, and $n_{LP02}$ of the signals in the $LP_{01}$, $LP_{11}$, $LP_{21}$, and $LP_{02}$ modes. Effective refractive indexes of the fundamental mode signals of the single-mode optical fibers 121, 122, 123, and 124 in the second coupling regions are respectively equal to the effective refractive indexes $n_{LP11}$, $n_{LP21}$, $n_{LP02}$, and $n_{LP01}$ of the signals in the $LP_{11}$, $LP_{21}$, $LP_{02}$, and $LP_{01}$ modes. In this way, the optical fiber signal mode conversion apparatus implements conversion from the $LP_{01}$ mode to the $LP_{11}$ mode, from the $LP_{11}$ mode to the $LP_{21}$ mode, from the $LP_{21}$ mode to the $LP_{02}$ mode, and from the $LP_{02}$ mode to the $LP_{01}$ mode. Therefore, the optical fiber transmission system using the optical fiber signal mode conversion apparatus shown in FIG. 11 performs three times of conversion in a cyclic mode, so that a signal in each mode is transmitted in the $LP_{01}$ mode, the $LP_{11}$ mode, the $LP_{21}$ mode, and the $LP_{02}$ mode for an equal distance. Therefore, the optical fiber transmission system can implement compensation for a group delay in a differential mode.

Figure 12:
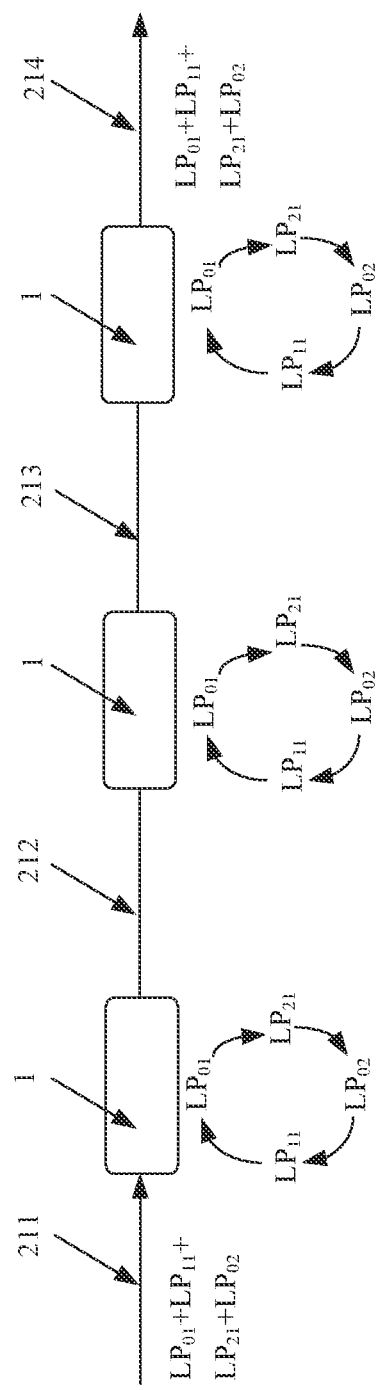
FIG. 12 is a block diagram of a structure of an optical fiber transmission system according to an embodiment of this application.
Figure 13:
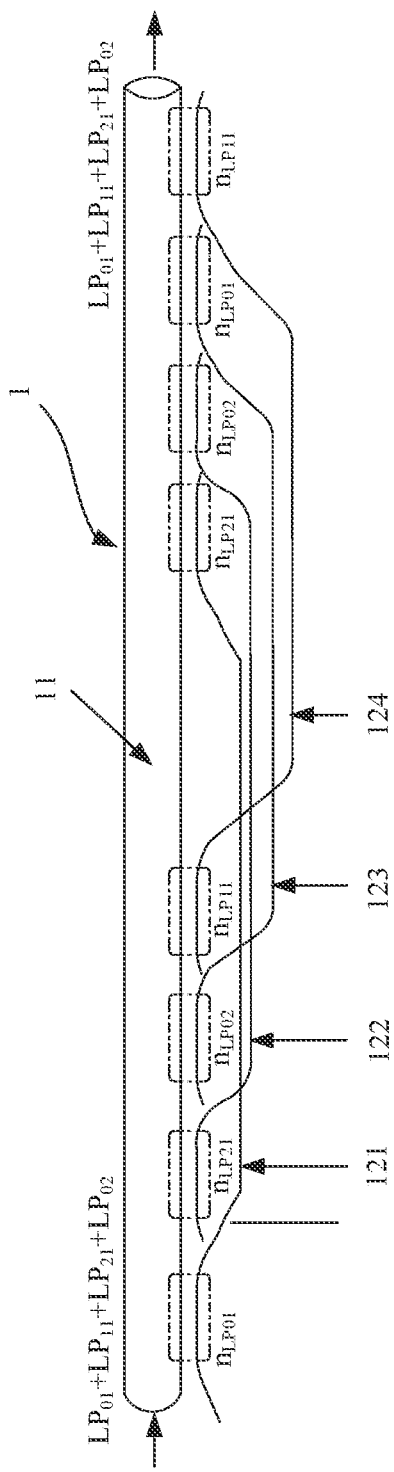
FIG. 13 is a schematic diagram of a structure of an optical fiber signal mode conversion apparatus in FIG. 12.

As shown in FIG. 12, an optical fiber transmission system implements a mode cycle in a different sequence from that shown in FIG. 10. An optical fiber signal mode conversion apparatus shown in FIG. 13 implements conversion from an $LP_{01}$ mode to an $LP_{21}$ mode, from the $LP_{21}$ mode to an $LP_{02}$ mode, from the $LP_{02}$ mode to an $LP_{11}$ mode, and from the $LP_{11}$ mode to the $LP_{01}$ mode. Similarly, the optical fiber transmission system using the optical fiber signal mode conversion apparatus shown in FIG. 12 and FIG. 13 performs three times of conversion in a cyclic mode, so that a signal in each mode is transmitted in the $LP_{01}$ mode, the $LP_{11}$ mode, the $LP_{21}$ mode, and the $LP_{02}$ mode for an equal distance. Therefore, the optical fiber transmission system can implement compensation for a group delay in a differential mode.

Figure 14:
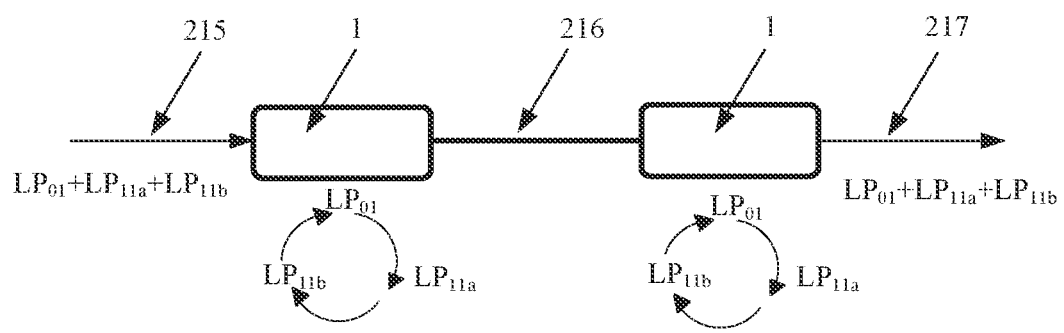
FIG. 14 is a block diagram of a structure of an optical fiber transmission system according to an embodiment of this application.

As shown in FIG. 14, an optical fiber transmission system is configured to transmit a signal in an $LP_{01}$ mode, a signal in an $LP_{11a}$ mode, and a signal in an $LP_{11b}$ mode, where the $LP_{11a}$ mode and the $LP_{11b}$ mode are two modes in a degenerate mode. Transmission optical fibers include a fifth transmission optical fiber 215, a sixth transmission optical fiber 216, and a seventh transmission optical fiber 217. In addition, axial lengths of the fifth transmission optical fiber 215, the sixth transmission optical fiber 216, and the seventh transmission optical fiber 217 are all equal. There are two optical fiber signal mode conversion apparatuses 1. One optical fiber signal mode conversion apparatus 1 is disposed at a node between the fifth transmission optical fiber 215 and the sixth transmission optical fiber 216. One optical fiber signal mode conversion apparatus 1 is disposed at a node between the sixth transmission optical fiber 216 and the seventh transmission optical fiber 217. In addition, the two optical fiber signal mode conversion apparatuses 1 are of a same structure.

Figure 15A:
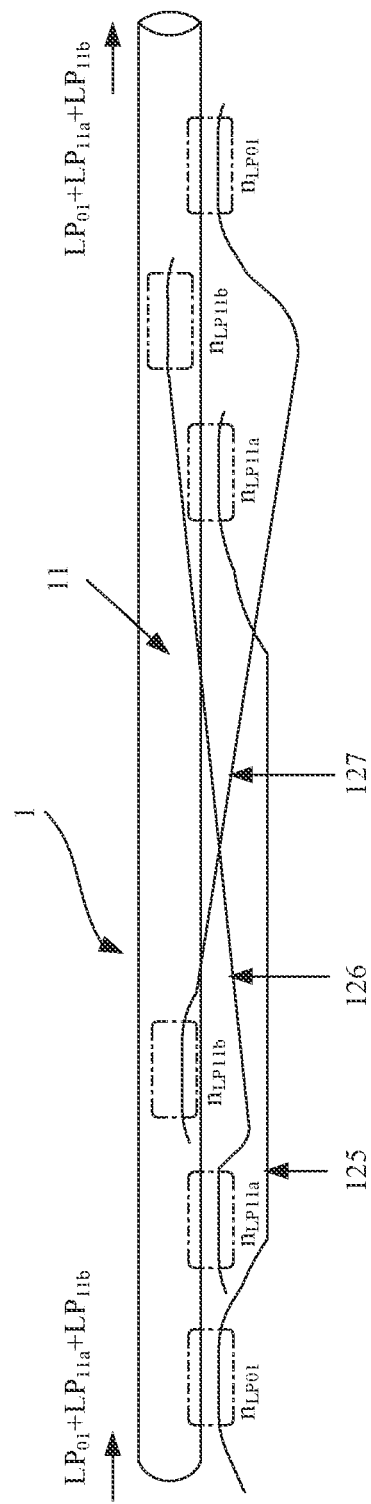
FIG. 15a is a schematic diagram of a structure of an optical fiber signal mode conversion apparatus in FIG. 14.

As shown in FIG. 15a, an embodiment of this application provides an optical fiber signal mode conversion apparatus. Single-mode optical fibers include single-mode optical fibers 125, 126, and 127. The single-mode optical fibers 125, 126, and 127 each form a first coupling region and a second coupling region with a few-mode optical fiber 11. Effective refractive indexes of fundamental mode signals of the single-mode optical fibers 125, 126, and 127 in the first coupling regions are respectively equal to effective refractive indexes $n_{LP01}$, $n_{LP11a}$, and $n_{LP11b}$ of the signals in the $LP_{01}$, $LP_{11a}$, and $LP_{11b}$ modes. Effective refractive indexes of the fundamental mode signals of the single-mode optical fibers 125, 126, and 127 in the second coupling regions are respectively equal to the effective refractive indexes $n_{LP11a}$, $n_{LP11b}$, and $n_{LP01}$ of the signals in the $LP_{11a}$, $LP_{11b}$, and $LP_{01}$ modes. The optical fiber signal mode conversion apparatus implements conversion from the $LP_{01}$ mode to the $LP_{11a}$ mode, from the $LP_{11a}$ mode to the $LP_{11b}$ mode, and from the $LP_{11b}$ mode to the $LP_{01}$ mode. Therefore, the optical fiber transmission system using the optical fiber signal mode conversion apparatus shown in FIG. 14 and FIG. 15a performs two times of conversion in a cyclic mode, so that a signal in each mode is transmitted in the $LP_{01}$ mode, the $LP_{11a}$ mode, and the $LP_{11b}$ mode for an equal distance. Therefore, the optical fiber transmission system can implement compensation for a group delay in a differential mode.

Figure 15B:
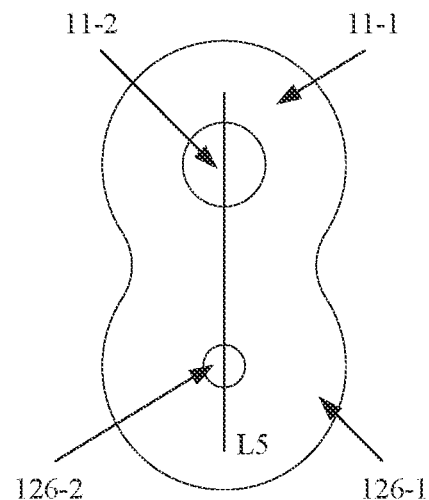
Figure 15C:
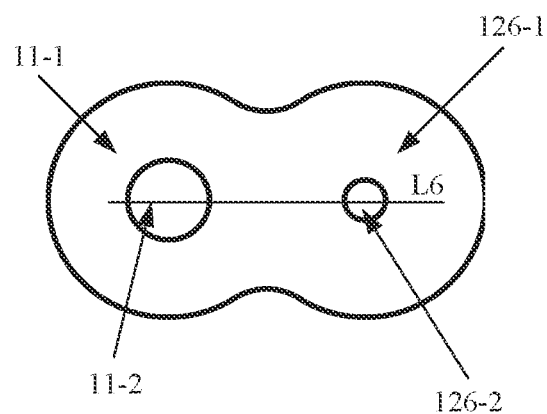

Because the $LP_{11a}$ mode and the $LP_{11b}$ mode are two modes of a degenerate mode, a phase difference between the $LP_{11a}$ mode and the $LP_{11b}$ mode is $\varphi$. Refer to FIG. 15b and FIG. 15c. In the first coupling region of the single-mode optical fiber 126, a center of a core 11-2 of the few-mode optical fiber 11 and a center of a core 126-2 of the single-mode optical fiber 126 are on a fifth straight line along a cross section of the few-mode optical fiber 11. In the second coupling region, the center of the core 11-2 of the few-mode optical fiber 11 and the center of the core 126-2 of the single-mode optical fiber 126 are on a sixth straight line along the cross section of the few-mode optical fiber 11. An included angle between the fifth straight line and the sixth straight line is equal to the phase difference between the $LP_{11a}$ mode and the $LP_{11b}$ mode.

Figure 16:
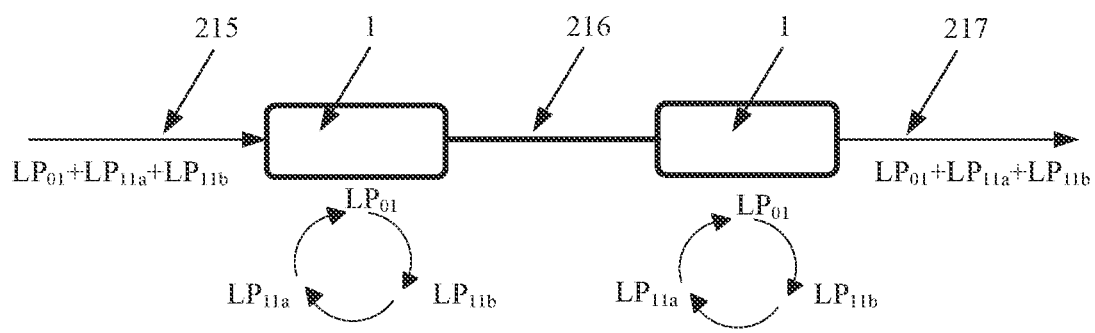
FIG. 16 is a block diagram of a structure of an optical fiber transmission system according to an embodiment of this application.
Figure 17:
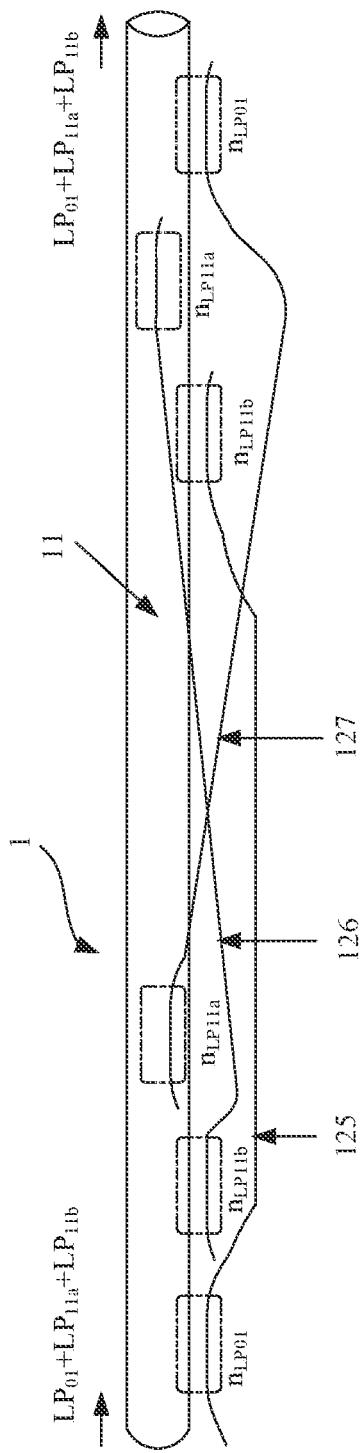
FIG. 17 is a schematic diagram of a structure of an optical fiber signal mode conversion apparatus in FIG. 16.

As shown in FIG. 16, an optical fiber transmission system implements a mode cycle in a different sequence from that shown in FIG. 14. An optical fiber signal mode conversion apparatus shown in FIG. 17 implements conversion from an $LP_{01}$ mode to an $LP_{11b}$ mode, from the $LP_{11b}$ mode to an $LP_{11a}$ mode, and from the $LP_{11a}$ mode to the $LP_{01}$ mode. Similarly, the optical fiber transmission system using the optical fiber signal mode conversion apparatus shown in FIG. 16 and FIG. 17 performs two times of conversion in a cyclic mode, so that a signal in each mode is transmitted in the $LP_{01}$ mode, the $LP_{11a}$ mode, and the $LP_{11b}$ mode for an equal distance. Therefore, the optical fiber transmission system can implement compensation for a group delay in a differential mode.

Figure 18:
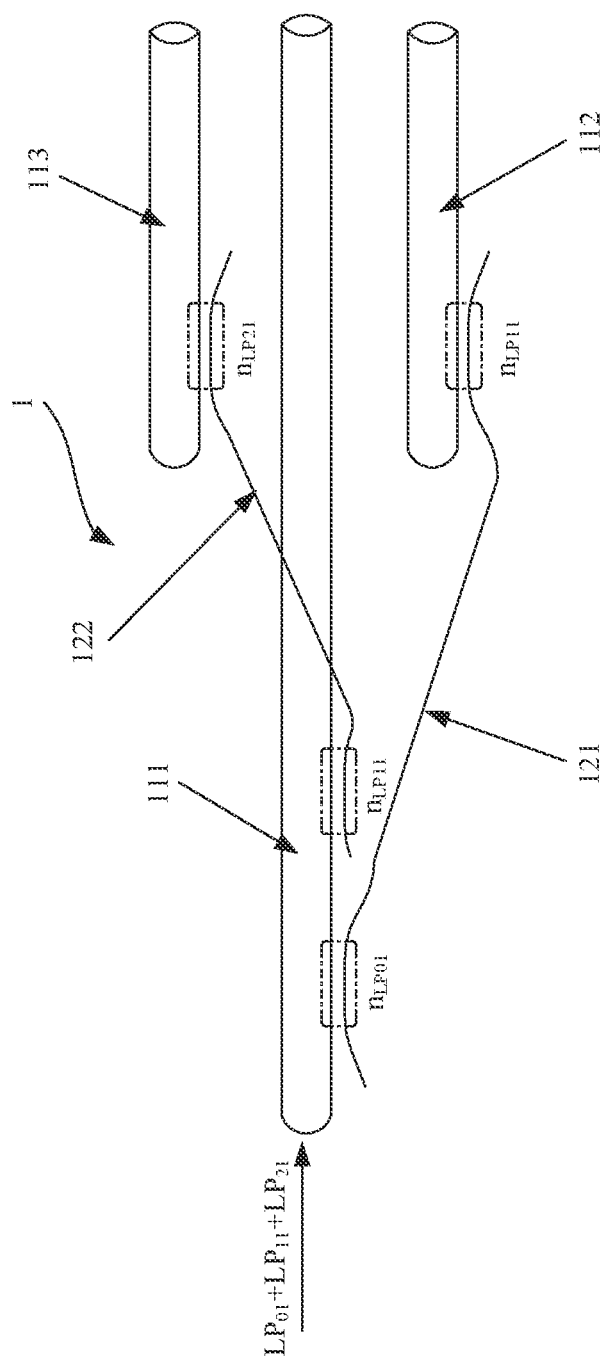
FIG. 18 is a schematic diagram of a structure of an optical fiber signal mode conversion apparatus according to an embodiment of this application.

The optical fiber signal mode conversion apparatus provided in this embodiment of this application may be further used in a mode add/drop multiplexing scenario. Refer to FIG. 18. A signal in an $LP_{01}$ mode that is transmitted in a few-mode optical fiber 111 is decoupled to a single-mode optical fiber 121, and a decoupled signal is finally converted into a signal in an $LP_{11}$ mode in a few-mode optical fiber 112 for transmission. A signal in the $LP_{11}$ mode that is transmitted in the few-mode optical fiber 111 is decoupled to a single-mode optical fiber 122, and a decoupled signal is finally converted into a signal in an $LP_{21}$ mode in a few-mode optical fiber 113 for transmission. This implements switching of mode signals in different optical fibers, and implements add/drop multiplexing of a mode-multiplexed signal.

An embodiment of this application further provides an optical fiber signal mode conversion method. The optical fiber signal mode conversion method is applied to the foregoing optical fiber signal mode conversion apparatus, and includes the following steps:

S1: When the signal in the first mode in the few-mode optical fiber 11 is transmitted to the first coupling region 13, decouple the signal in the first mode to the fundamental mode channel of the single-mode optical fiber 12, and transmit a decoupled signal in the single-mode optical fiber 12 as a fundamental mode signal.

S2: When the fundamental mode signal in the single-mode optical fiber 12 is transmitted to the second coupling region 14, couple the fundamental mode signal of the single-mode optical fiber 12 to the second mode channel of the few-mode optical fiber 11, and transmit a coupled signal in the few-mode optical fiber 11 in the second mode. Therefore, the first mode is converted into the second mode.

In the descriptions of this specification, the described specific features, structures, materials, or characteristics may be combined in a proper manner in any one or more of the embodiments or examples.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:
1. An optical fiber signal mode conversion apparatus, comprising:
   a non-single-mode optical fiber, wherein the non-single-mode optical fiber comprises a first mode channel and a second mode channel, the first mode channel is configured to transmit a signal in a first mode, and the second mode channel is configured to transmit a signal in a second mode; and a single-mode optical fiber, configured to form, with the non-single-mode optical fiber, a first coupling region and a second coupling region along a signal transmission direction in the non-single-mode optical fiber, wherein:

an effective refractive index of a fundamental mode signal of the single-mode optical fiber in the first coupling region is equal to an effective refractive index of the signal in the first mode, and the signal in the first mode is coupled to a fundamental mode channel of the single-mode optical fiber; and an effective refractive index of the fundamental mode signal of the single-mode optical fiber in the second coupling region is equal to an effective refractive index of the signal in the second mode, and the fundamental mode signal of the single-mode optical fiber is coupled to the second mode channel; and a length of the first coupling region is equal to a coupling length for the signal in the first mode, wherein the coupling length is a shortest length when optical signal energy is completely transferred from the non-single-mode optical fiber to the single-mode optical fiber for a first time.

2. The optical fiber signal mode conversion apparatus according to claim 1, wherein the non-single-mode optical fiber comprises a first optical fiber, the first coupling region is formed between the single-mode optical fiber and the first optical fiber, and the second coupling region is formed between the single-mode optical fiber and the first optical fiber.

3. The optical fiber signal mode conversion apparatus according to claim 1, wherein the non-single-mode optical fiber comprises a first optical fiber and a second optical fiber, the first coupling region is formed between the single-mode optical fiber and the first optical fiber, and the second coupling region is formed between the single-mode optical fiber and the second optical fiber.

4. The optical fiber signal mode conversion apparatus according to claim 3, wherein:

the optical fiber signal mode conversion apparatus further comprises a dynamic optical switching apparatus, the first optical fiber forms M first coupling regions with M single-mode optical fibers, and the M first coupling regions are connected to input ends of the dynamic optical switching apparatus through the M single-mode optical fibers;

there are M second optical fibers, the M second optical fibers respectively form M second coupling regions with the M single-mode optical fibers, and the M second coupling regions are connected to output ends of the dynamic optical switching apparatus through the M single-mode optical fibers; and M is an integer greater than or equal to 2.

5. The optical fiber signal mode conversion apparatus according to claim 1, wherein a length of the second coupling region is equal to a coupling length for the fundamental mode signal of the single-mode optical fiber to be coupled to the second mode channel.

6. The optical fiber signal mode conversion apparatus according to claim 1, wherein:

in the first coupling region, the non-single-mode optical fiber and the single-mode optical fiber are arranged in parallel, and a cladding of the non-single-mode optical fiber and a cladding of the single-mode optical fiber are spliced;

in the second coupling region, the non-single-mode optical fiber and the single-mode optical fiber are arranged in parallel, and the cladding of the non-single-mode optical fiber and the cladding of the single-mode optical fiber are spliced; and a value range of a distance d between a center of a core of the non-single-mode optical fiber and a center of a core of the single-mode optical fiber is: $d \in [R_{f1}+R_{s1}, R_{f2}+R_{s2}]$, wherein $R_{f1}$ is a radius of the core of the non-single-mode optical fiber, $R_{s1}$ is a radius of the core of the single-mode optical fiber, $R_{f2}$ is a radius of the cladding of the non-single-mode optical fiber, and $R_{s2}$ is a radius of the cladding of the single-mode optical fiber.

7. The optical fiber signal mode conversion apparatus according to claim 1, wherein a refractive index of a core of the single-mode optical fiber in the first coupling region is a first refractive index, a refractive index of the core of the single-mode optical fiber in the second coupling region is a second refractive index, a refractive index of the core of the single-mode optical fiber in a non-coupling region between the first coupling region and the second coupling region is a third refractive index, and the third refractive index is between the first refractive index and the second refractive index.

8. The optical fiber signal mode conversion apparatus according to claim 1, wherein the first mode and the second mode are two modes in a degenerate mode;

the effective refractive index of the fundamental mode signal of the single-mode optical fiber in the first coupling region is equal to the effective refractive index of the fundamental mode signal of the single-mode optical fiber in the second coupling region; and a center of a core of the non-single-mode optical fiber and a center of a core of the single-mode optical fiber are on a first straight line along a cross section of the non-single-mode optical fiber in the first coupling region, the center of the core of the non-single-mode optical fiber and the center of the core of the single-mode optical fiber are on a second straight line along the cross section of the non-single-mode optical fiber in the second coupling region, and an included angle between the first straight line and the second straight line is equal to a phase difference between the first mode and the second mode.

9. The optical fiber signal mode conversion apparatus according to claim 1, wherein:

the second mode is a degenerate mode, and the second mode comprises a first submode and a second submode;

the optical fiber signal mode conversion apparatus is configured to convert the first mode into the first submode, the effective refractive index of the fundamental mode signal of the single-mode optical fiber in the second coupling region is $n_1$, the optical fiber signal mode conversion apparatus is further configured to convert the first mode into the second submode, the effective refractive index of the fundamental mode signal of the single-mode optical fiber in the second coupling region is $n_2$, and $n_1=n_2$; and the optical fiber signal mode conversion apparatus is configured to convert the first mode into the first submode, a center of a core of the non-single-mode optical fiber and a center of a core of the single-mode optical fiber are on a third straight line along a cross section of the non-single-mode optical fiber in the first coupling region, the optical fiber signal mode conversion apparatus is further configured to convert the first mode into the second submode, the center of the core of the non-single-mode optical fiber and the center of the core of the single-mode optical fiber are on a fourth straight line along the cross section of the non-single-mode optical fiber in the second coupling region, and an included angle between the third straight line and the fourth straight line is equal to a phase difference between the first submode and the second submode.

10. The optical fiber signal mode conversion apparatus according to claim 1, wherein:
the optical fiber signal mode conversion apparatus is configured to convert N modes, and N is an integer greater than or equal to 2;
the non-single-mode optical fiber comprises N mode channels, and the N mode channels are in a one-to-one correspondence with the N modes;
there are N single-mode optical fibers, and any single-mode optical fiber forms the first coupling region and the second coupling region with the non-single-mode optical fiber;
a mode that is of the non-single-mode optical fiber and that is coupled to any single-mode optical fiber is one of the N modes; and
a mode that is of any single-mode optical fiber and that is coupled to the non-single-mode optical fiber is one of the N modes, and the mode that is of the non-single-mode optical fiber and that is coupled to any single-mode optical fiber is different from the mode that is of the single-mode optical fiber and that is coupled to the non-single-mode optical fiber.

11. The optical fiber signal mode conversion apparatus according to claim 10, wherein a plurality of first coupling regions are successively arranged along an axial direction of the non-single-mode optical fiber, and a plurality of second coupling regions are successively arranged along the axial direction of the non-single-mode optical fiber.

12. The optical fiber signal mode conversion apparatus according to claim 10, wherein the optical fiber signal mode conversion apparatus further comprises a dynamic optical switching apparatus, N input ends of the dynamic optical switching apparatus are connected to N first coupling regions through the N single-mode optical fibers, and N output ends of the dynamic optical switching apparatus are connected to N second coupling regions through the N single-mode optical fibers.

13. An optical fiber signal mode conversion method, wherein the optical fiber signal mode conversion method is applied to an optical fiber signal mode conversion apparatus, wherein the optical fiber signal mode conversion apparatus comprises:
a non-single-mode optical fiber, wherein the non-single-mode optical fiber comprises a first mode channel and a second mode channel, the first mode channel is configured to transmit a signal in a first mode, and the second mode channel is configured to transmit a signal in a second mode; and
a single-mode optical fiber, configured to form, with the non-single-mode optical fiber, a first coupling region and a second coupling region along a signal transmission direction in the non-single-mode optical fiber, wherein:
an effective refractive index of a fundamental mode signal of the single-mode optical fiber in the first coupling region is equal to an effective refractive index of the signal in the first mode, and the signal in the first mode is coupled to a fundamental mode channel of the single-mode optical fiber; and an effective refractive index of the fundamental mode signal of the single-mode optical fiber in the second coupling region is equal to an effective refractive index of the signal in the second mode, and the fundamental mode signal of the single-mode optical fiber is coupled to the second mode channel; and
a length of the first coupling region is equal to a coupling length for the signal in the first mode, wherein the coupling length is a shortest length when optical signal energy is completely transferred from the non-single-mode optical fiber to the single-mode optical fiber for a first time;
and wherein the method comprises:
when the signal in the first mode in the non-single-mode optical fiber is transmitted to the first coupling region, decoupling the signal in the first mode to the fundamental mode channel of the single-mode optical fiber, and transmitting a decoupled signal in the single-mode optical fiber as the fundamental mode signal; and
when the fundamental mode signal in the single-mode optical fiber is transmitted to the second coupling region, coupling the fundamental mode signal of the single-mode optical fiber to the second mode channel of the non-single-mode optical fiber, and transmitting a coupled signal in the non-single-mode optical fiber in the second mode.

14. An optical fiber transmission system, comprising:
transmission optical fibers, wherein the transmission optical fibers comprise a first transmission optical fiber and a second transmission optical fiber, and the first transmission optical fiber and the second transmission optical fiber each comprise a first mode channel and a second mode channel;
an optical fiber signal mode conversion apparatus disposed at a node between the first transmission optical fiber and the second transmission optical fiber, wherein the optical fiber signal mode conversion apparatus comprises:
a non-single-mode optical fiber, wherein the non-single-mode optical fiber comprises the first mode channel and the second mode channel, the first mode channel is configured to transmit a signal in a first mode, and the second mode channel is configured to transmit a signal in a second mode; and
a single-mode optical fiber, configured to form, with the non-single-mode optical fiber, a first coupling region and a second coupling region along a signal transmission direction in the non-single-mode optical fiber, wherein:
an effective refractive index of a fundamental mode signal of the single-mode optical fiber in the first coupling region is equal to an effective refractive index of the signal in the first mode, and the signal in the first mode is coupled to a fundamental mode channel of the single-mode optical fiber; and
an effective refractive index of the fundamental mode signal of the single-mode optical fiber in the second coupling region is equal to an effective refractive index of the signal in the second mode, and the fundamental mode signal of the single-mode optical fiber is coupled to the second mode channel; and
a length of the first coupling region is equal to a coupling length for the signal in the first mode, wherein the coupling length is a shortest length when optical signal energy is completely transferred from the non-single-mode optical fiber to the single-mode optical fiber for a first time, and wherein an optical inlet of the non-single-mode optical fiber is opposite to an optical outlet of the first transmission optical fiber, and an optical outlet of the non-single-mode optical fiber is opposite to an optical inlet of the second transmission optical fiber.

15. The optical fiber transmission system according to claim 14, wherein:
the optical fiber transmission system is configured to transmit signals in N modes, and N is an integer greater than or equal to 2;
there are N segments of transmission optical fibers, axial lengths of the N segments of transmission optical fibers are all equal, each segment of transmission optical fiber has N mode channels, and the N mode channels are in a one-to-one correspondence with the N modes; and
there are N-1 optical fiber signal mode conversion apparatuses, and one optical fiber signal mode conversion apparatus is disposed at a node between two segments of transmission optical fibers.

16. The optical fiber transmission system according to claim 14, wherein the non-single-mode optical fiber comprises a first optical fiber, the first coupling region is formed between the single-mode optical fiber and the first optical fiber, and the second coupling region is formed between the single-mode optical fiber and the first optical fiber.

17. The optical fiber transmission system according to claim 14, wherein the non-single-mode optical fiber comprises a first optical fiber and a second optical fiber, the first coupling region is formed between the single-mode optical fiber and the first optical fiber, and the second coupling region is formed between the single-mode optical fiber and the second optical fiber.

18. The optical fiber transmission system according to claim 17, wherein:
the optical fiber signal mode conversion apparatus further comprises a dynamic optical switching apparatus, the first optical fiber forms M first coupling regions with M single-mode optical fibers, and the M first coupling regions are connected to input ends of the dynamic optical switching apparatus through the M single-mode optical fibers;
there are M second optical fibers, the M second optical fibers respectively form M second coupling regions with the M single-mode optical fibers, and the M second coupling regions are connected to output ends of the dynamic optical switching apparatus through the M single-mode optical fibers; and
M is an integer greater than or equal to 2.

19. The optical fiber transmission system according to claim 17, wherein a length of the second coupling region is equal to a coupling length for the fundamental mode signal of the single-mode optical fiber to be coupled to the second mode channel.

20. The optical fiber transmission system according to claim 17, wherein:
in the first coupling region, the non-single-mode optical fiber and the single-mode optical fiber are arranged in parallel, and a cladding of the non-single-mode optical fiber and a cladding of the single-mode optical fiber are spliced;
in the second coupling region, the non-single-mode optical fiber and the single-mode optical fiber are arranged in parallel, and the cladding of the non-single-mode optical fiber and the cladding of the single-mode optical fiber are spliced; and
a value range of a distance d between a center of a core of the non-single-mode optical fiber and a center of a core of the single-mode optical fiber is: $d \in [R_{f1}+R_{s1}, R_{f2}+R_{s2}]$, wherein
$R_{f1}$ is a radius of the core of the non-single-mode optical fiber, $R_{s1}$ is a radius of the core of the single-mode optical fiber, $R_{f2}$ is a radius of the cladding of the non-single-mode optical fiber, and $R_{s2}$ is a radius of the cladding of the single-mode optical fiber.

* * * * *